US005647002A

United States Patent [19]
Brunson

[11] Patent Number: 5,647,002
[45] Date of Patent: Jul. 8, 1997

[54] SYNCHRONIZATION OF MAILBOXES OF DIFFERENT TYPES

[75] Inventor: Gordon Richards Brunson, Broomfield, Colo.

[73] Assignee: Lucent Technologies Inc., Murray Hill, N.J.

[21] Appl. No.: 522,823

[22] Filed: Sep. 1, 1995

[51] Int. Cl.$^6$ ............................. H04L 9/00; H04M 1/64
[52] U.S. Cl. .................. 380/49; 380/48; 380/50; 379/67; 379/88; 379/201; 379/93.24
[58] Field of Search .................. 380/4, 48, 49, 380/50, 59; 379/67, 88, 89, 90, 93, 96, 110, 201; 370/110.1

[56] References Cited

U.S. PATENT DOCUMENTS

| | | | |
|---|---|---|---|
| 4,476,349 | 10/1984 | Cottrell et al. | |
| 4,612,416 | 9/1986 | Emerson et al. | |
| 4,646,346 | 2/1987 | Emerson et al. | 379/214 |
| 4,837,798 | 6/1989 | Cohen et al. | 379/88 |
| 5,333,266 | 7/1994 | Boaz et al. | 395/200 |
| 5,349,636 | 9/1994 | Irribarren | 379/89 |
| 5,479,411 | 12/1995 | Klein | 370/110.1 |
| 5,557,659 | 9/1996 | Hyde-Thomson | 379/88 |

OTHER PUBLICATIONS

J. Helliwell, *Help! Lotus Notes 3.0*, Ziff–Davis Press, Emeryville, CA, 1993, pp. 172–177.
T. Landers, *GBCS, Lotus Bring Order to Message Chaos*, AT&T News, Feb. 1995, p. 3.
Computer Telephony, *Unified Messaging*, vol. 2, Issue 7, Jul. 1995, pp. 47–55, 60, 62–68, 72–76.

*Primary Examiner*—Bernarr E. Gregory
*Attorney, Agent, or Firm*—David Volejnicek

[57] ABSTRACT

The contents of a pair of mailboxes (21, 31), one of which resides in an e-mail system (29) and the other of which resides in a voice-mail system (39), are automatically synchronized both in message content and in message state by a synchronizer (10), even though messages in the two mailboxes may have different data structures and carry information expressed in different media and having different formats. Synchronization is effected by automatically creating a corresponding message in one mailbox for every message that arrives in the other mailbox of the mailbox pair. If the corresponding message does not contain all of the information carried by the original message—for example, because some information in the original message is expressed in a medium or has a format that is incompatible, or cannot be made compatible by conversion, with the other system—a partial-copy indication (217) is raised for the corresponding message, and the behavior of synchronization is altered to protect the original message contents. The behavior of synchronization may also be tailored to accommodate automatic message expiration, or to synchronize message-header notifications only.

19 Claims, 18 Drawing Sheets

SYNCHRONIZATION OF MAILBOXES OF DIFFERENT TYPES

TECHNICAL FIELD

This invention relates to electronic messaging systems.

BACKGROUND OF THE INVENTION

Various types of electronic messaging systems are known in the art. They include single-medium systems such as e-mail systems and voice mail systems, as well as multi-media messaging systems, such as the AT&T Intuity® messaging system, that handle messages having any combination of voice, fax, text, and data components. Mostly, these various types of systems are incompatible with each other. For example, they use different kinds of telecommunications networks—telephone network, data LANs, the Internet—for message transport. They use different kinds of terminals—data terminals, telephones, fax machines, multimedia workstations—for message creation and retrieval. They handle different types of media—voice, data, still image, video, plain (ASCII) text, enriched text, etc. They use different kinds of objects—binary data files, compressed digitized audio files, bit map image files, graphics files, compressed digitized image files—for message representation. They use different addressing schemes—data network login IDs, telephone numbers, Internet addresses. And even messaging systems that handle the messages of the same media represented in the same objects and addressed via the same address type are often incompatible because of differences in message structure or in formats of the same kinds of objects. Hence, interoperability—the exchange of messages—between the various messaging systems is often impossible.

As a consequence, a user wishing to exchange messages with various sources or destinations must often employ a plurality of messaging systems, and individually monitor the status of all of them.

To avoid imposing this burden on users, various schemes have been proposed for informing the users in a unified manner of the arrival of messages in any of a plurality of messaging systems, and for enabling the users to retrieve messages from a plurality of messaging systems through one of those messaging systems. Illustrative examples of such schemes are described in U.S. Pat. Nos. 4,837,798, 4,476,349, 4,646,346, and 4,612,416.

Schemes that merely rely upon informing the users in a unified manner of the arrival of messages in any of a plurality of messaging systems only address the problem of a user having to monitor a plurality of systems for message arrival; they do nothing to ease the user's need to access a plurality of the systems. Moreover, these schemes have not been broadly endorsed, because the notifications can become more troublesome than effective. For example, one known implementation of integrated notification of e-mail and voice mail messages created two notifications for each received message, one notification for each system. These notifications had to be dealt with independently. They were not directly tied to the messages, and as a consequence, a user could first see a notification in system A, then go to system B to retrieve the message, and become confused as to whether the message being retrieved was the one which created the notifications or a newly-arrived message which might also have created a latent notification that would be encountered at some time in the future in messaging system A.

Schemes that enable users to retrieve messages from a plurality of messaging systems through others of those messaging systems typically rely upon translation of the messages from the media, objects, and/or formats of the native messaging system into the media, objects, and/or formats of the messaging system or systems through which the messages will be retrieved. An illustrative example of such a translation scheme is disclosed in U.S. patent application Ser. No. 08/029193 to R. M. Klein entitled "Multi-Media Integrated Message Arrangement", filed on Mar. 10, 1993, issued on Dec. 26, 1995, as U.S. Pat. No. 5,479,411, and assigned to the same assignee as this application. Unfortunately, all media, objects, and/or formats are not fully convertible into all other media, objects, and/or formats. Unconstrained "morphing" without loss of fidelity or information is technically infeasible at this time. For example, it is presently not feasible to convert a video object into an audio object, or vice versa, without a significant loss of information. Nor is it forseen to become feasible in the future. The reason is that this type of morphing is more a question of interpretation than of conversion, and depends on human perceptions and human experience that machines cannot duplicate.

While it is relatively easy to understand why this cannot always work, it is more difficult to determine when it might work acceptably well. For example, text-to-speech conversion is now to the point where pronunciation errors are minimal, so that it can be effectively used as an audio method of accessing text information. Also, optical character recognition can convert text-only faxes to text with very high accuracy. Despite the character recognition errors and the mechanized voice pronunciation errors, enough information is conveyed to make the message understandable. So as technology advances, morphing may become more acceptable as an information-access method. But it is highly unlikely that it will ever become as effective as, and hence that it will fully replace, the ability to access messages in their native form.

An emerging approach to this problem is to provide integration at the user interface for messages being retained in more than one messaging system. The problem here is that each user interface must be enhanced to deal with the peculiarities of the various messaging systems. This often results in a confusing user interface where the operations involved in managing a message are dependent upon which messaging system "owns" (i.e., is the native system of) the message. Another problem may arise when a user moves messages out of the native messaging server, which thereby precludes the server from performing its intended services with respect to those messages.

SUMMARY OF THE INVENTION

This invention is directed to solving these and other problems and disadvantages of the art. Generally according to the invention, the contents of a pair of mailboxes, each one of which resides in a different electronic messaging system, are automatically synchronized both in message content and in message state. Illustratively, one messaging system may be an e-mail system and the other messaging system may be a voice-mail system. The synchronization enables the mailbox user/owner to depend on either system to notify him or her of arrival of any messages in both systems. The user may retrieve all messages from either system and do so in an identical manner for all messages, or may retrieve some messages from the one system and other messages from the other system irrespective of which system the messages originated on. The user may also determine the correct status of all messages from examining either system. Synchronization is effected in part by automatically creating a corresponding message in the mailbox in the one system for every message that arrives in the mailbox in the other system. If the corresponding message does not contain all of the information of the original message—for example, because some information in the original message is expressed in a medium or has a format that is incompatible with the other system—a partial-copy indication is raised for the corresponding message. This alerts the user who accesses the corresponding message in the one system to the fact that he or she must access the original message in the message's native system in order to obtain all message information. This feature allows synchronization of mailboxes on different types of messaging systems that are incompatible, or cannot be made compatible by message structure, media, and format conversions, with each other. It also allows a user to select the degree of synchronization—for example, to synchronize message headers only. Optionally, the synchronization may be conducted only in one direction, wherein contents of the one mailbox are synchronized with the contents of the other mailbox but not vice versa. This avoids synchronization processing that may be superfluous if the user exclusively or predominantly accesses the one mailbox and not the other.

Specifically according to the invention, there is provided a synchronizer for synchronizing a first mailbox of a first electronic messaging system with a second mailbox of a second electronic messaging system, the first electronic messaging system for handling first messages and defining at least one first mailbox for storing the first messages, each first message having a first data structure containing information expressed in a first medium and having a first format, and each stored first message having one of a plurality of states, and the second electronic messaging system for handling second messages and defining at least one second mailbox for storing the second messages, each second message having a second data structure containing information expressed in a second medium and having a second format, at least one of the second data structure, the second medium, and the second format being different respectively from the first data structure, the first medium, and the first format, and each stored second message having one of the plurality of states. The synchronizer comprises means responsive to storing of a second message in the second mailbox, for retrieving at least some of the information from the second message, generating a corresponding first message forming a message pair with the second message and containing at least some of the information retrieved from the second message, storing the first message in the first mailbox, and also raising a partial-copy indication for the first message if the first message does not contain all of the information contained in the second message of the message pair. The synchronizer also comprises means responsive to a change in state of one stored message of a message pair, for effecting a same said change in state of the other stored message of the message pair. The synchronizer furthermore comprises means responsive to deletion of one stored message of a message pair from one of the mailboxes, for deleting the other stored message of the message pair from the other mailbox. Alternatively, state changes and/or message deletions may be conducted in only one direction.

Preferably, the synchronization is fully bidirectional, and the synchronizer further comprises means responsive to storing of a first message in the first mailbox, for retrieving at least some of the information from the first message, generating a corresponding second message forming a message pair with the first message and containing at least some of the information retrieved from the first message, storing the second message in the second mailbox, and also raising a partial-copy indication for the second message if the second message does not contain all of the information contained in the first message of the message pair. Further preferably, the synchronization between the two messages of a message pair may be "broken" or unlinked. This allows messages in one mailbox to enter states or to undergo state transitions that are incompatible with the other mailbox.

In addition to the synchronizer, an apparatus comprising the synchronizer and the two messaging systems, and a synchronization method comprising the functionality of the synchronizer, are also claimed.

These and other advantages and features of the invention will become more apparent from the following description of an illustrative embodiment of the invention taken together with the drawing.

DETAILED DESCRIPTION

Figure 1:
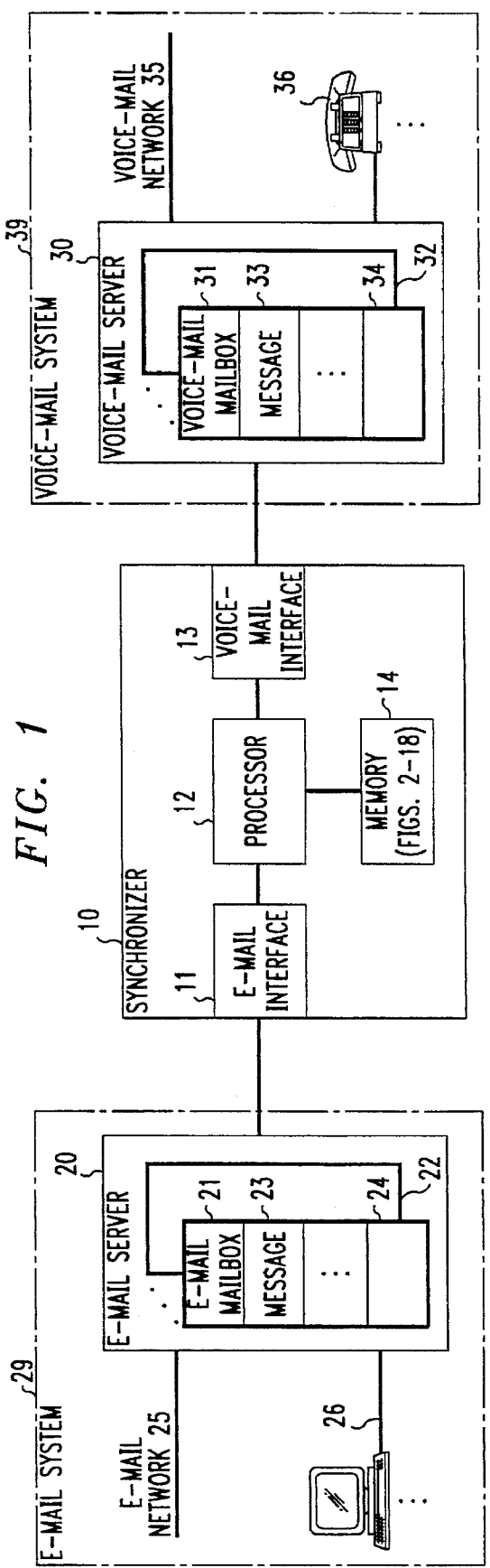
FIG. 1 is a block diagram of a telecommunications system which includes an illustrative embodiment of the invention.

FIG. 1 shows a telecommunications system that comprises a plurality of interconnected messaging systems: a conventional e-mail system 29 and a conventional voice-mail system 39. While for illustrative purposes only two different messaging systems are shown, the telecommunications system of FIG. 1 may comprise any number of any types of messaging systems. As is conventional, the e-mail system 29 includes an e-mail server 20, such as a host processor, that serves a plurality of e-mail user terminals 26, such as personal computers. User terminals 26 may be connected to e-mail server 20 directly, or indirectly by an email network 25, such as a LAN, a WAN, or some other data transport network. E-mail network 25 also connects e-mail server 20 to other e-mail servers of the e-mail system 29. E-mail server 20 implements a plurality of e-mail mailboxes 21–22 for receiving and storing e-mail messages 23–24 for subscribers of the e-mail system 29. Illustratively, the e-mail system 29 is the Lotus Notes system.

As is conventional, the voice-mail system 39 includes a voice-mail server 30, such as an AT&T Intuity® messaging system. In actuality, the Intuity messaging system is a multi-media system that is presently capable of accommodating separate or integrated audio, fax, text, and data messages. But to simplify this illustration, only the audio capability of the Intuity messaging system will be considered here in any detail. Voice-mail server 30 serves a plurality of voice-mail terminals 36, such as telephones. Although voice-mail terminals 36 may be connected to voice-mail server 30 directly, typically they are connected to the voice-mail server 30 by means of a voice-mail network 35, such as the telephone network. Voice-mail network 35 also connects voice-mail server 30 to other voice-mail servers of the voice-mail system 39. Voice-mail server 30 implements a plurality of voice-mail mailboxes 31-32 for receiving and storing audio messages 33-34 for subscribers of the voice-mail system 39.

According to the invention, the e-mail system 29 and the voice-mail system 39 are interconnected by a synchronizer 10. Synchronizer 10 is illustratively implemented by a suitably-programmed general-purpose computer. Synchronizer 10 has an e-mail interface 11 for communicating with e-mail server 20 by means of a communications protocol that is understood by e-mail server 20, such as a version of the standard ("common messaging calls") CMC protocol put forth by an X.400 subcommittee of the XAPIA industry committee. Synchronizer 10 also has a voice-mail interface 13 for communicating with voice-mail server 30 by means of a communications protocol that is understood by voice-mail server 30. In the case of the voice-mail server 30 being the Intuity messaging system, the protocol is preferably version 4 of the Intuity Messaging Application Programmer's Interface (IMAPI) protocol. Synchronizer 10 further includes a memory 14 for storing data and programs, and a processor 12 which executes the programs and uses the data that are stored in memory 14. Alternatively, synchronizer 10 may be implemented on e-mail server 20 or on voice-mail server 30.

Figure 2:
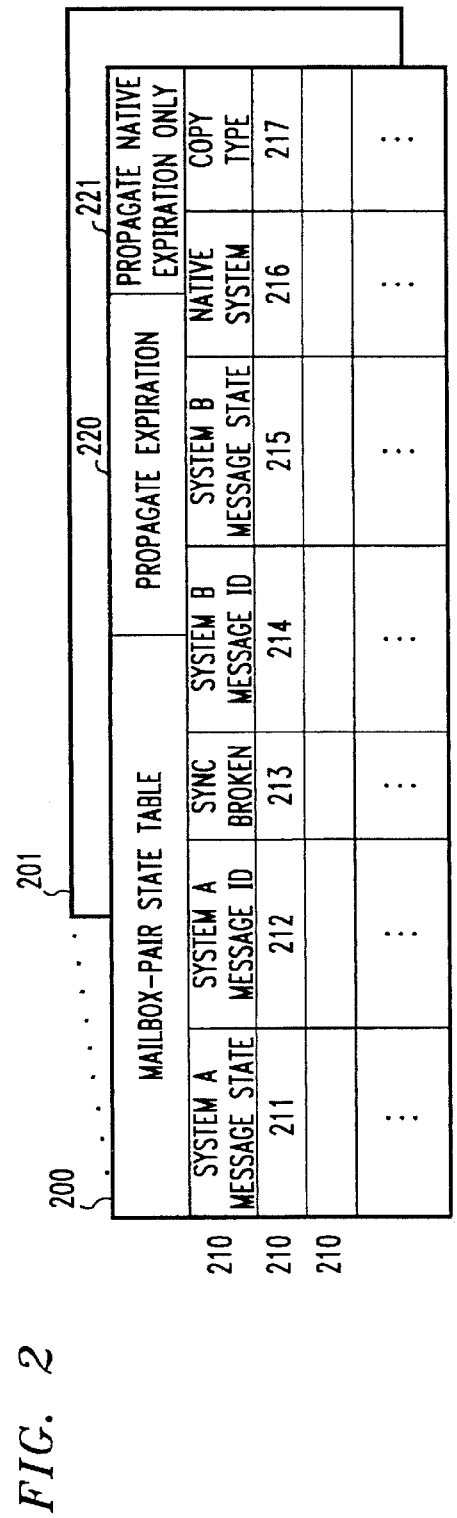
FIG. 2 is a block diagram of a data structure of the synchronizer of the system of FIG. 1.

Memory 14 of synchronizer 10 includes a plurality of mailbox-pair state tables 200-201, as shown in FIG. 2. There is one table 200-201 per mailbox pair. A mailbox pair is a pair of mailboxes, one in each of the systems 29, 39 whose contents are to be synchronized, and that may or may not belong to the same user. For example, if mailbox 21 in e-mail system 29 and mailbox 31 in voice-mail system 39 belong to the same user, then the mailboxes 21 and 31 form a mailbox pair. Illustratively, mailbox-pair state table 200 in FIG. 2 corresponds with the mailbox pair 21, 31 in FIG. 1.

Mailbox-pair state table 200 includes a synchronize "headers only", from system A to system B, entry 222 which indicates whether only message headers should be synchronized and propagated from e-mail mailbox 21 to voice-mail mailbox 31. Mailbox-pair state table 200 also includes a synchronize "headers only", from system B to system A, entry 223 which indicates whether only message headers should be synchronized and propagated from voice-mail mailbox 31 to e-mail mailbox 21. If either (or both) of entries 222 and 223 indicate headers-only synchronization, only the corresponding message header appears in the mailbox of the message's non-native system and the message body appears in only the mailbox of the message's native (originating) system.

Mailbox-pair state table 200 also includes a propagate expiration entry 220 which indicates whether a state change of a message in voice-mail mailbox 31 to the expired state should or should not cause a corresponding state change to be made to the corresponding message in e-mail mailbox 21. Mailbox-pair state table 200 also includes a propagate native expiration only field 221. This field is used only when field 220 indicates that message expiration is being propagated from mailbox 31 to mailbox 21, and it indicates whether the propagation of message expiration should be done for all messages in mailbox 31 or only for messages that are native to mailbox 31 (i.e., messages that originated in voice-mail system 39).

Entries 220-223 allow selection of the extent to which synchronization should be effected. Entries 220-223 are either administratively-programmable or user-programmable.

Mailbox-pair state table 200 further includes an entry 210 for each message pair comprising a message in mailbox 21 of e-mail system 29 (illustratively designated as system A in FIG. 2) and a corresponding message in mailbox 31 of voice-mail system 39 (illustratively designated as system B in FIG. 2). Each entry 210 has a plurality of data fields 211-217. Field 211 indicates the state of the message of the message pair in mailbox 21. System A message states are: new (not yet accessed by the recipient subscriber), old (accessed by the recipient subscriber but not deleted), and deleted (no longer in the mailbox). Field 212 indicates the ID of the message in mailbox 21. Each message in a mailbox has a unique ID. Field 213 indicates whether synchronization of mailboxes 21 and 31 is being done for the message pair, or whether synchronization has been broken and the messages of the message pair are being handled independently (i.e., as unrelated messages) in each of the mailboxes 21 and 31. Field 214 indicates the ID of the message of the message pair in mailbox 31. Field 215 indicates the state of the message in mailbox 31. Illustratively, system B message states are the system A message states, plus "expired" (has been in the mailbox for longer than a predetermined period of time). It will therefore be seen that the synchronizer 10 can handle synchronization of messaging systems that have non-identical message states. Field 216 indicates which of systems 29 and 39 is the native system of the message pair, i.e., the system from which the message pair originated. And field 217 indicates the copy type of the corresponding message in the non-native system, i.e., whether the copy is a full or a partial copy of the native-system's message.

Memory 14 further includes a trio of synchronization programs which are shown in FIGS. 3-7, 8-13, and 14-18. The programs of FIGS. 8-18 effect synchronization of the contents of mailbox pairs, while the program of FIGS. 3-7 effects the synchronization of the states of those contents. The program of FIGS. 3-7 is executed on a polling (e.g., a round-robin) basis for each mailbox pair. Illustratively, execution of the program of FIGS. 3-7 is repeated for each mailbox pair either every few minutes, or each time that there is a change to the contents and/or content status of a mailbox of the mailbox pair. For purposes of illustration, the following discussion assumes execution of the program of FIGS. 3-7 for the mailbox pair 21, 31 (i.e., in step 300 of FIG. 3, X=21, 31 ).

Figure 3:
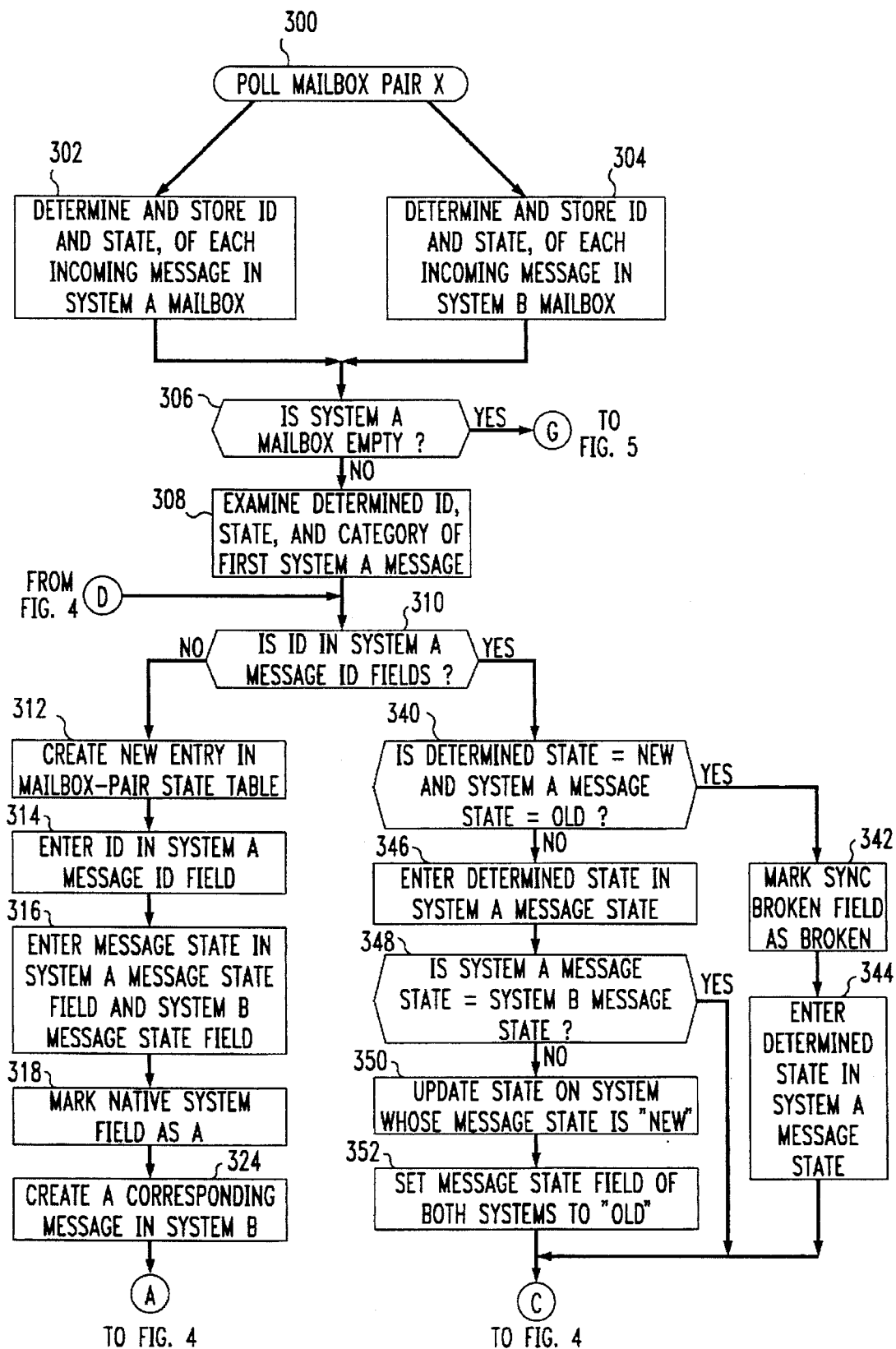
FIGS. 3–7 are a flow diagram of a message-state synchronization function of the synchronizer of the system of FIG. 1.
Figure 4:
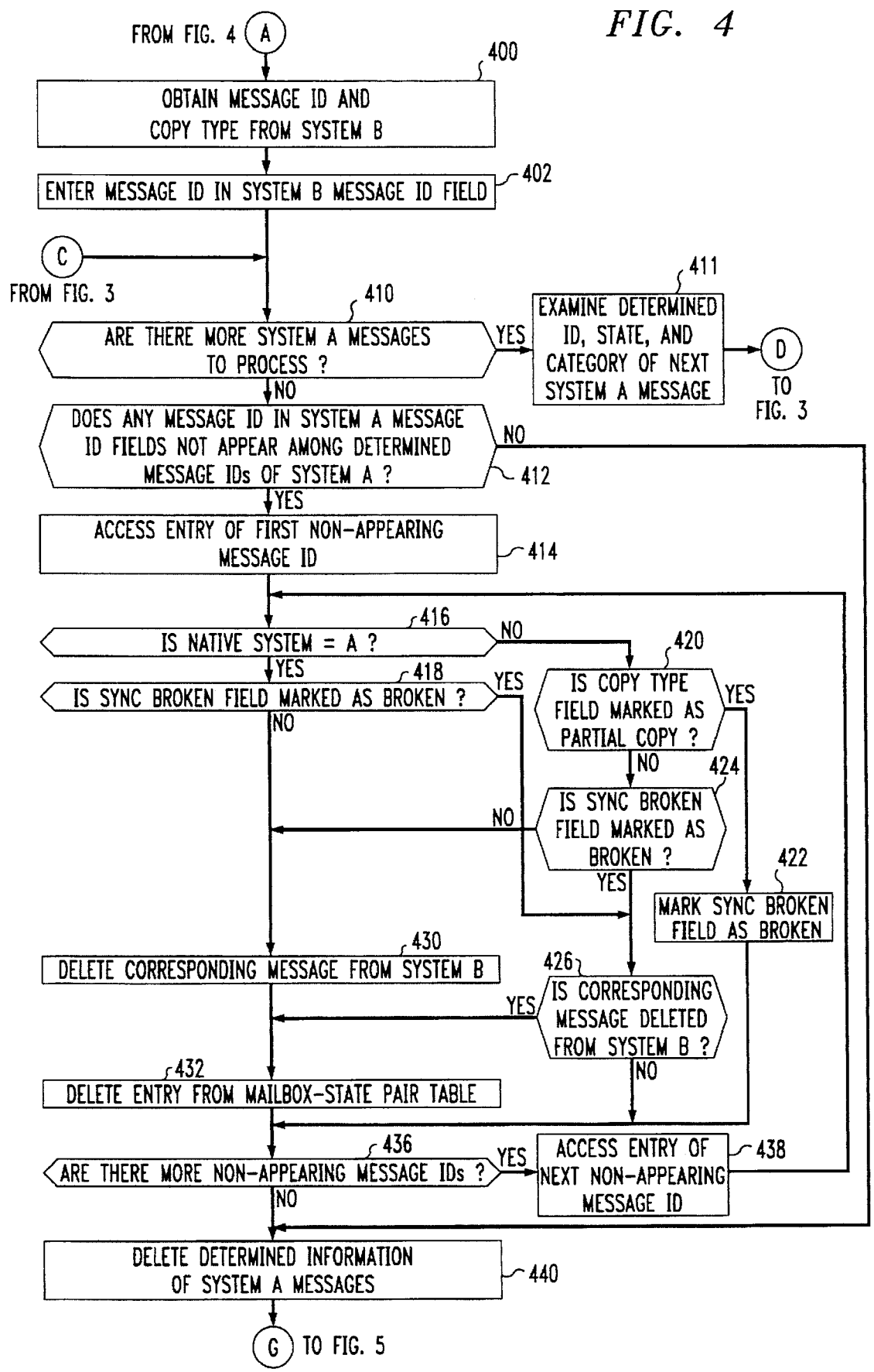
Figure 5:
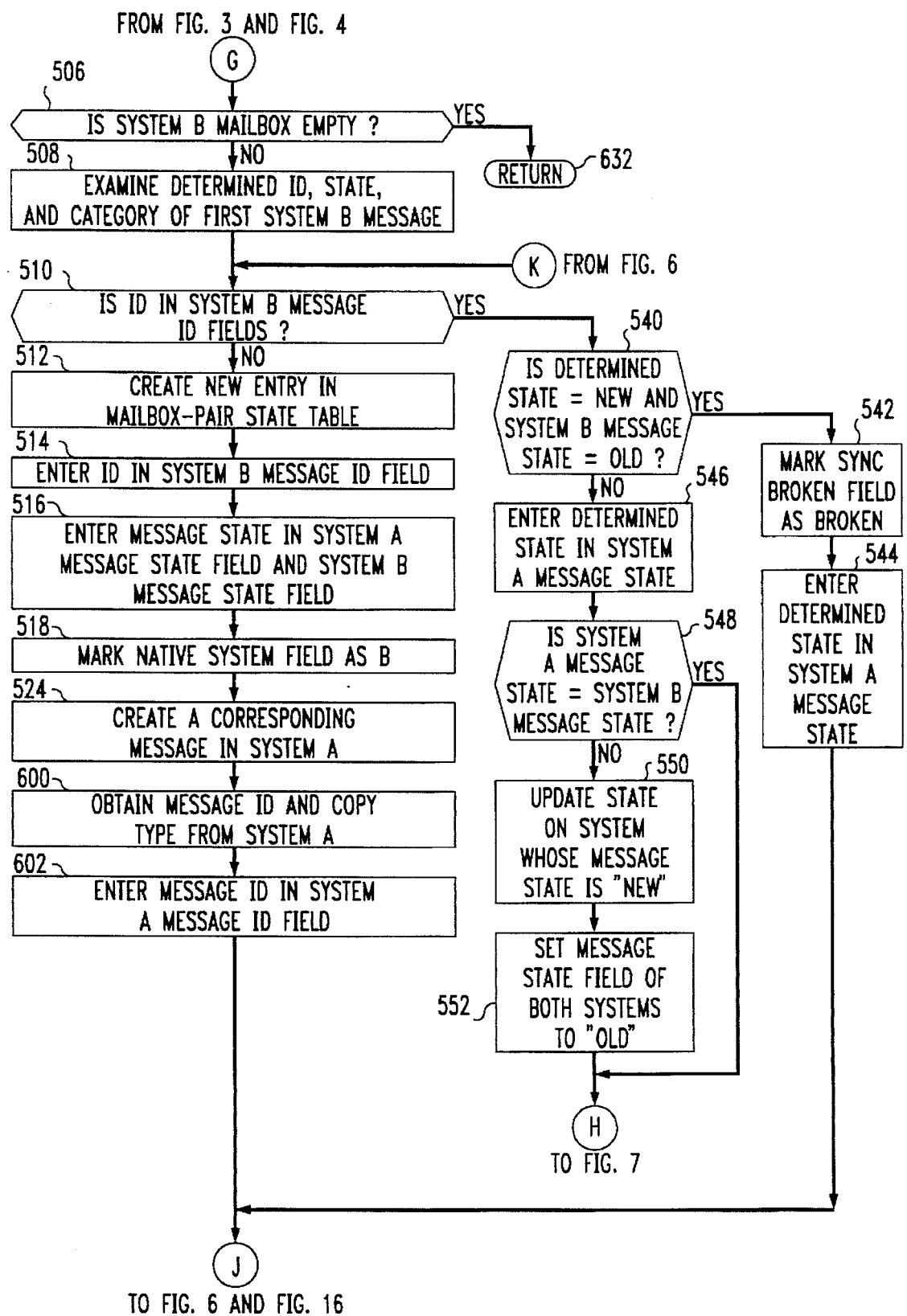
Figure 6:
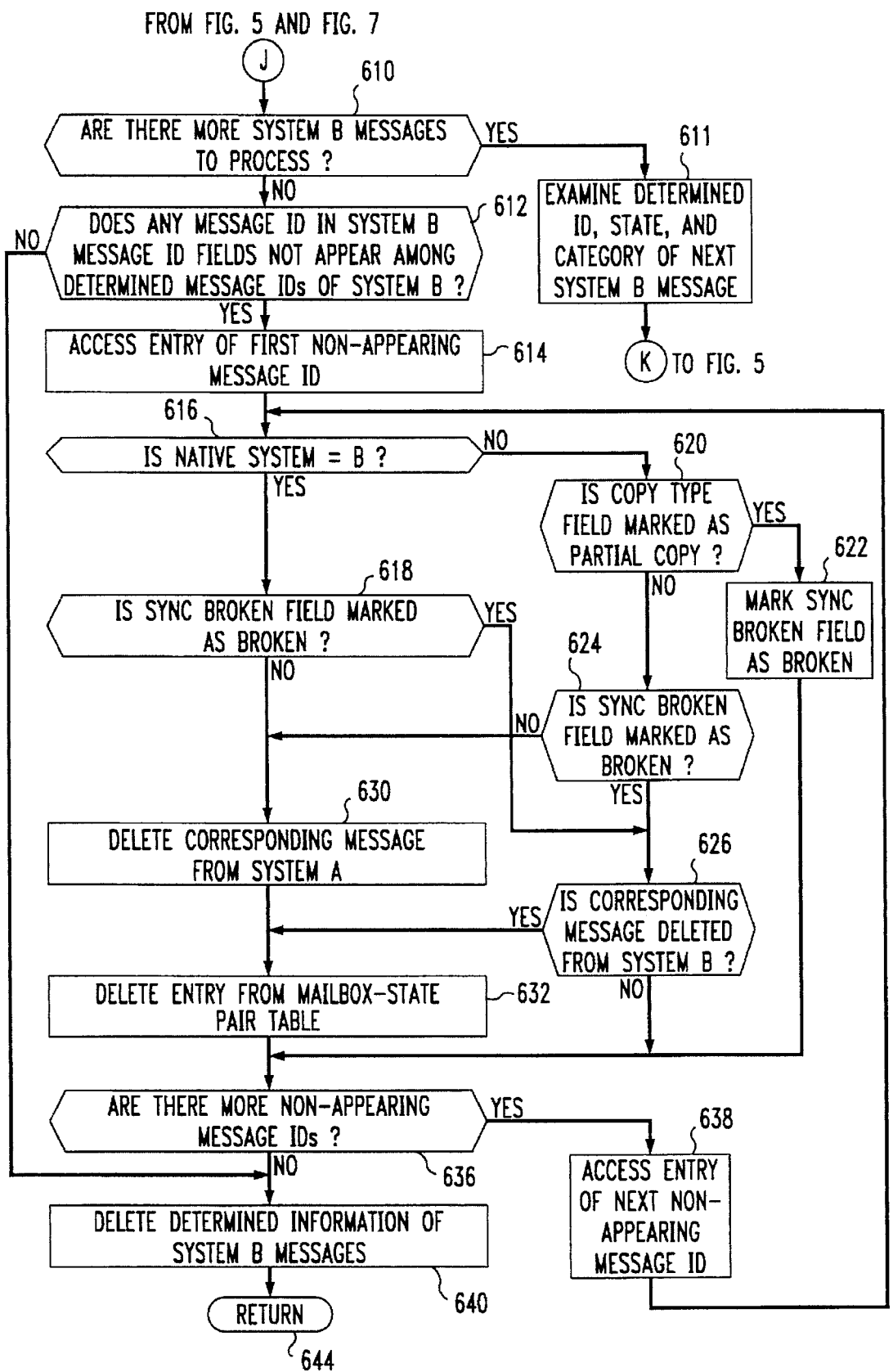

When execution of the program is invoked for mailbox pair 21, 31, at step 300 of FIG. 3, processor 12 interacts with servers 20 and 30 through interfaces 11 and 13, respectively, to determine the IDs and states of incoming messages that are presently stored in mailboxes 21 and 31, at steps 302 and 304, respectively. Preferably, processor 12 makes the determinations of steps 302 and 304 simultaneously; alternatively, it makes the determinations of steps 302 and 304 first for the mailbox of one server 20, 30 and then for the mailbox of the other server 20, 30. Processor 12 stores the determined information in memory 14, also steps 302 and 304. Processor 12 then checks the determined information for whether the mailbox 21 of one of the systems is empty, at step 306. If so, processor proceeds to step 506 of FIG. 5 to process any contents of mailbox 31 of the other system.

If mailbox 21 is not empty, processor 12 examines the determined information for a first message in mailbox 21, at step 308, and checks that message's message ID against the contents of system A message ID fields 212 of all entries 210 of table 200 to determine if that message ID appears in table 200, at step 310. If that message ID does not appear in table 200, the message is newly-received in mailbox 21 since the last time that the program of FIGS. 3–7 was executed for mailbox pair 21, 31. Processor 12 therefore creates a new entry 210 in table 200 for this message, at step 312, and enters the message's ID in system A message ID field 212 of this new entry 210, at step 314. Processor 12 also enters the determined state of this message into the system A message state field 211 and system B message state field 215 of this new entry 210, at step 316, and enters "A" in the native system field 216 of this new entry 210, at step 318. Processor 12 then executes the program of FIGS. 14–18 to create a corresponding message—one that is either a full or a partial copy of the message in mailbox 21—in mailbox 31, at step 324. Processor 12 then communicates with mailbox 31 to obtain the message ID and copy type—full copy or partial copy—of this corresponding message, at step 400 of FIG. 4, and enters the obtained message ID in system B message ID field 214 of the new entry 210, at step 402. Processor 12 then checks the information that it stored at step 302 to see if there are more messages in mailbox 21 to process, at step 410. If there are more messages, processor 12 examines the determined and stored information for a next message in mailbox 21, at step 411, and returns to step 310 to process this message.

Returning to step 310, if processor 12 there determines that the message's ID does appear in system A message ID field 212 of an entry 210 of table 200, processor 12 determines whether the message's state in mailbox 21 is "new" while the message's state in system A message state field 211 of its entry 210 in table 200 is "old", at step 340. If so, it means that the subscriber of mailbox 21 had manually changed the message's state in mailbox 21 from "old" to "new". This interferes with normal message state changes and conflicts with mailbox synchronization, so processor 12 marks the sync broken field 213 of that message's entry 210 as "broken", at step 342, to indicate that the message copies of this message will no longer be synchronized between mailboxes 21 and 31. Processor 12 then enters the state of the message that was determined from mailbox 21 in the system A message field 211 of that message's entry 210, at step 344, and proceeds to step 410 of FIG. 4.

Returning to step 340, if the condition there is not met, processor 12 enters the state of the message that was determined from mailbox 21 in the system A message state field 211 of that message's entry 210, at step 346. Processor 12 then compares the contents of system A message state field 211 and system B message state field 215 of that message's entry 210 to determine if the message has the same state in both mailboxes 21 and 31, at step 348. If the message has the same state in both mailboxes 21 and 31, the mailboxes are synchronized, and processor 12 merely proceeds to step 410 of FIG. 4. If the message does not have the same state in both mailboxes 21 and 31, processor 12 proceeds to synchronize the states. It communicates with the one of the mailboxes 21 and 31 whose message state is indicated in the message's entry 210 to be "new" to update the message state in that one mailbox to "old", at step 350. It also ensures that both of the message state fields 211 and 215 of that message's entry 210 are set to "old", at step 352. Processor 12 then proceeds to step 410 of FIG. 4 to see if there are more messages in mailbox 21 to process.

If and when processor 12 determines at step 410 that there are no more messages in mailbox 21 to process, processor 12 checks the contents of system A message ID fields 212 of all entries 210 of table 200 against the information that it stored at step 302 to see if any message IDs that appear in table 200 do not appear in mailbox 21. If not, processor 12 proceeds to step 430; if so, it means that one or more messages have been deleted from mailbox 21. Processor 12 therefore accesses the entry 210 in table 200 of a first one of these deleted messages, at step 414, and checks its native system field 216 to determine if the native system is system 29, at step 416. If the native system is not system 29, processor 12 checks whether copy type field 217 of the accessed entry 210 is marked as partial copy, at step 420. If field 217 is marked as partial copy, processor 12 marks the sync broken field 213 of the accessed entry 210 as "broken", at step 424, and then proceeds to step 436. If field 217 is not marked as partial copy, processor 12 checks whether sync broken field 213 is marked as broken, at step 424. If field 213 is not marked as broken, processor 12 proceeds to step 430; if field 213 is marked as broken, processor 12 proceeds to step 432.

Returning to step 416, if the native system is found there to be system 29, processor 12 checks the sync broken field 213 of the accessed entry 210 to determine if it is marked as "broken", at step 416. If so, processor 12 proceeds to step 426. At step 426, processor 12 communicates with mailbox 31 to determine whether the corresponding message (identified by contents of system B message ID field 214 in FIG. 2) has been deleted from mailbox 31. If it determines that the corresponding message has been deleted from mailbox 31, processor 12 proceeds to step 432. If it determines that the corresponding message has not been deleted from mailbox 31, processor 12 proceeds to step 436.

Returning to step 418, if processor 12 determines there that sync broken field 213 of the accessed entry 210 is not marked broken, processor 12 communicates with mailbox 31 to delete the corresponding message from mailbox 31, at step 430. The message has now been deleted from both mailboxes 21 and 31, and so processor 21 deletes that message's entry 210 from table 200, at step 432, and proceeds to step 436.

At step 436, processor 12 checks the determination it made at step 412 to see if there are more entries 210 that do not have corresponding messages in mailbox 21. If so, processor 12 accesses the next such entry 210 in table 200, at step 438, and returns to step 416 to delete this entry 210 and its corresponding message. If not, processor 12 is done processing the contents of mailbox 21. It therefore deletes from memory 14 the information that it determined and stored at step 302, at step 440, and proceeds to process the contents of mailbox 31, at step 506 of FIG. 5.

The processing of the contents of mailbox 31 by processor 12 is identical for the most part as its just-described processing of the contents of mailbox 21. Consequently, steps 506–640 of FIGS. 5 and 6 replicate steps 306–440, respectively, of FIGS. 3 and 4, respectively, with references to elements A and B, 29 and 39, 21 and 31, 211 and 215, and 212 and 214, respectively, and to FIGS. 14–18 and 8–13, respectively, being substituted one for the other in the Figures and in the accompanying description. The only differences are that, if processor 12 finds mailbox 31 to be empty at step 506, or after it completes processing the last message in mailbox 31 at step 640, it ends execution of the program of FIGS. 3–7 and returns to its previous activities, at step 632 or 644, respectively.

Figure 7:
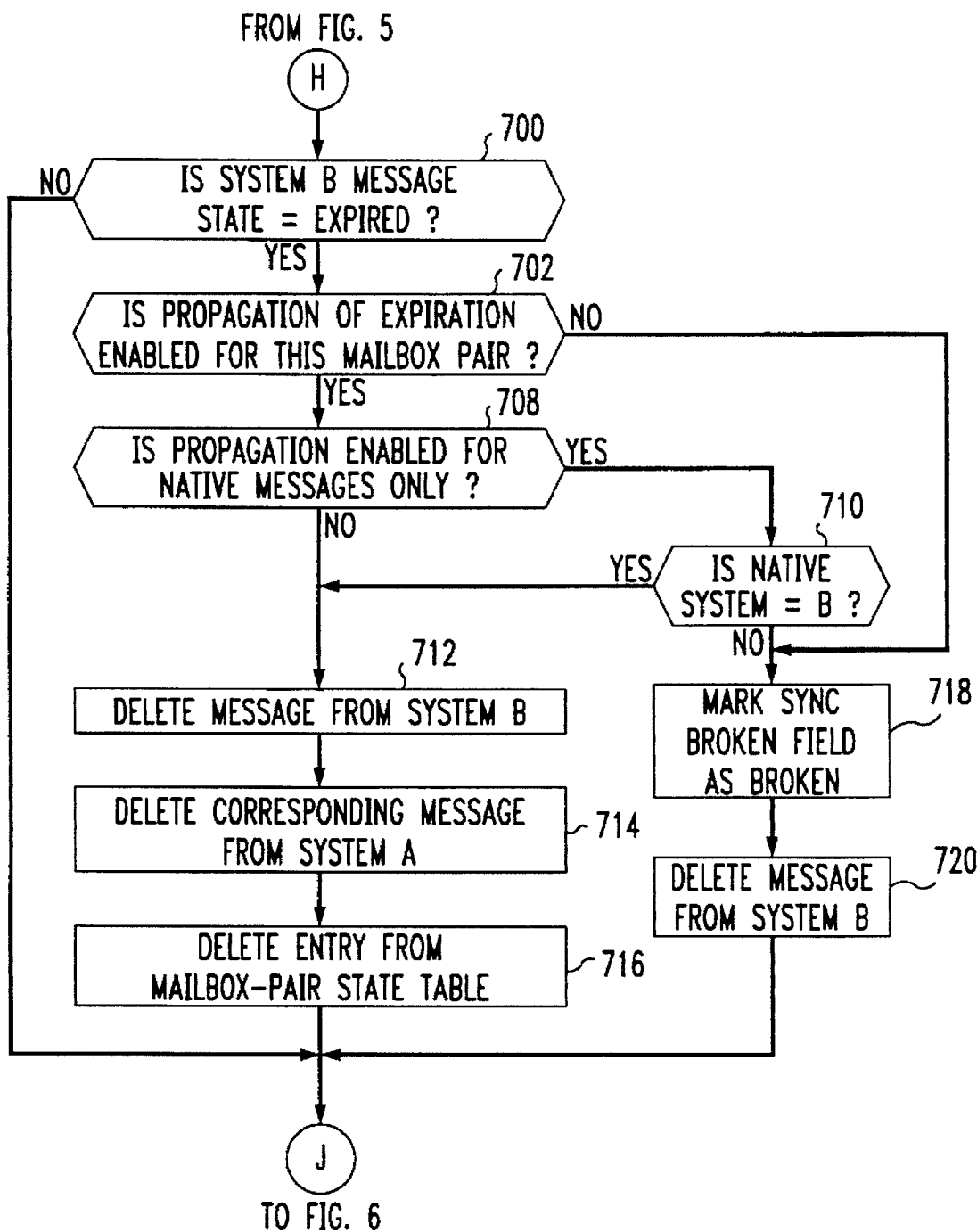
Figure 8:
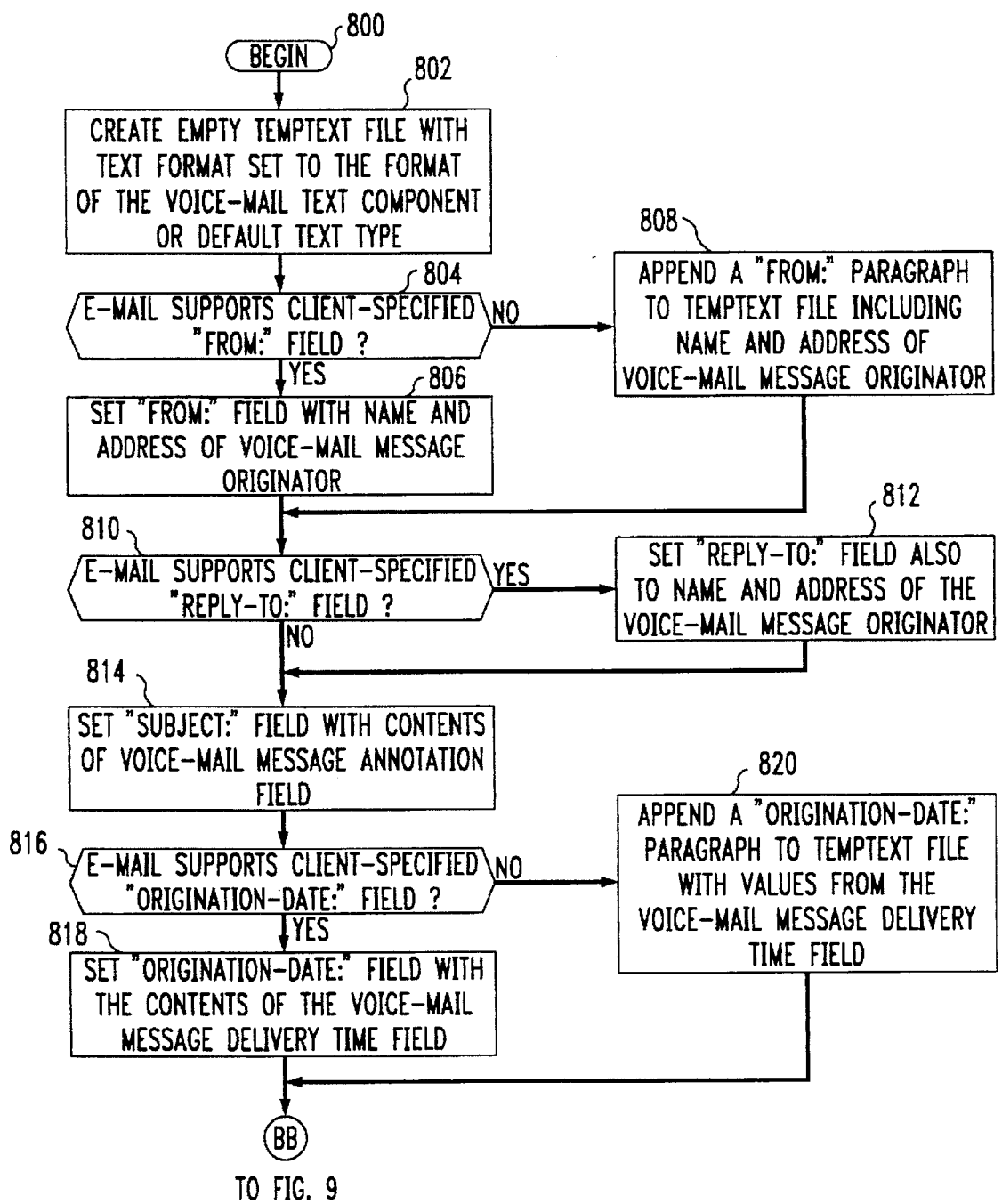
FIGS. 8–13 are a flow diagram of a message-creation function of the synchronizer of the systems of FIG. 1 for creating an e-mail system message from a voice-mail system message.
Figure 9:
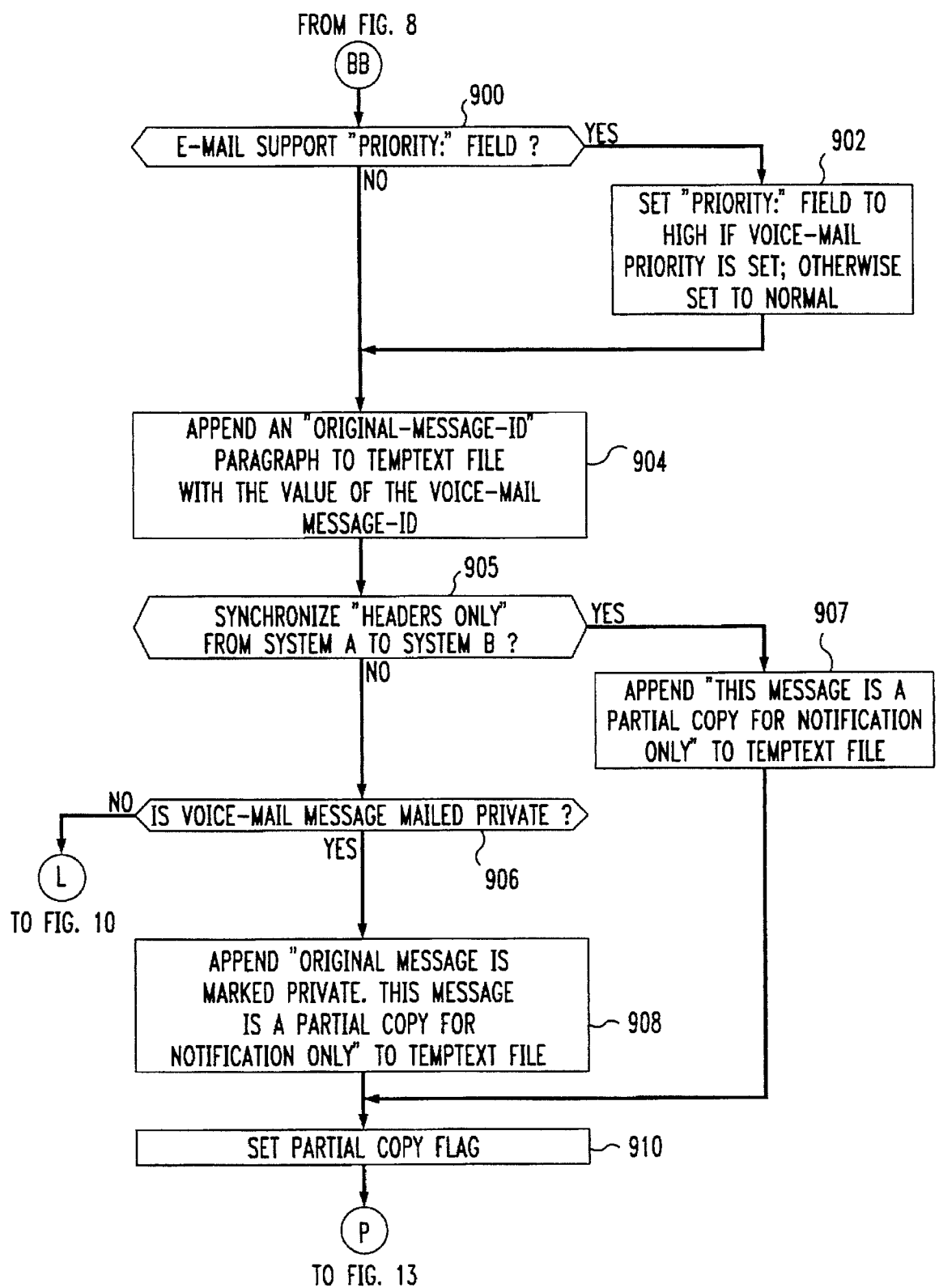
Figure 10:
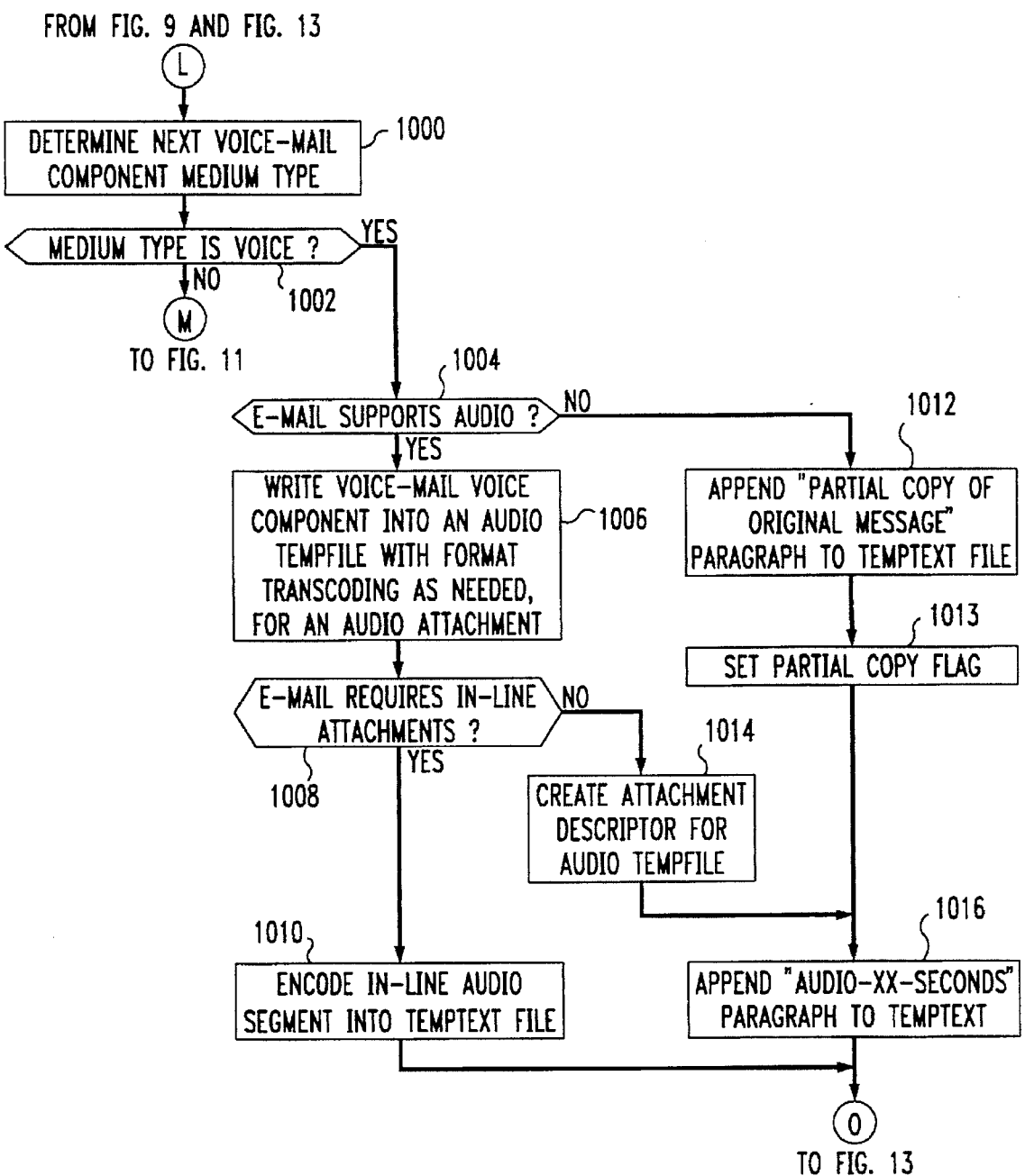

There is, however, the additional message state of "expired" that processor 12 must handle with respect to mailbox 31 that it did not have to handle with respect to mailbox 21. Therefore, following the synchronization of message states in both mailboxes 21 and 31, at steps 550 and 552, processor 12 executes that portion of the program of FIGS. 3–7 that is shown in FIG. 7. Processor 21 checks system B message state field 215 of the message's entry 210 to see if the message's state in mailbox 31 is "expired", at step 700. If not, processor 12 proceeds to step 610 of FIG. 6; if so, processor 12 checks "propagate expiration" field 220 of table 200 to determine if propagation of message expiration from mailbox 31 to mailbox 21 is enabled for this mailbox pair 21, 31, at step 702. The value of field 220 is either administratively programmable, or user-programmable by the subscriber-owner of mailboxes 21 and 31. If propagation of message expiration is not enabled, synchronization for the message cannot be effected between mailboxes 21 and 31. Processor 12 therefore marks sync broken field 213 of the message's entry 210 as "broken", at step 718, and then communicates with mailbox 31 to cause the message to be deleted from mailbox 31, at step 720. Processor 12 then proceeds to step 610 of FIG. 6.

If propagation of message expiration is found to be enabled at step 702, processor 12 check a "propagate native expiration only" field 221 of table 200 to determine if propagation of message expiration only of messages that are native to system 39 is enabled for this mailbox pair 21, 31, at step 708. Like field 220, the value of field 221 is either administratively programmable, or user-programmable by the subscriber-owner of mailboxes 21 and 31. If propagation of expiration of only native messages is enabled, processor 12 check native system field 216 of the message's entry 210 to see which system is the native system for this message, at step 710. If system 29 is the native system, processor 21 proceeds to step 718. If system 31 is the native system, processor 21 performs the same actions as when propagation of expiration of all messages is found to be enabled at step 708: it communicates with mailbox 31 to delete the message therefrom, at step 712; it communicates with mailbox 21 to delete the corresponding message copy therefrom, at step 714; it deletes the message's entry 210 from table 200, at step 716; and then it proceeds to step 610 of FIG. 6.

Figure 19:
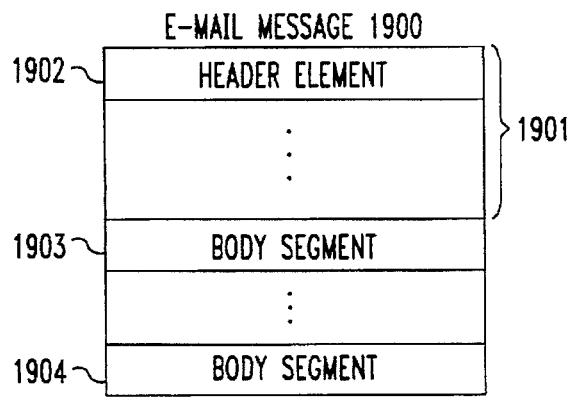
FIG. 19 is a block diagram of a first generalized e-mail system message.
Figure 20:
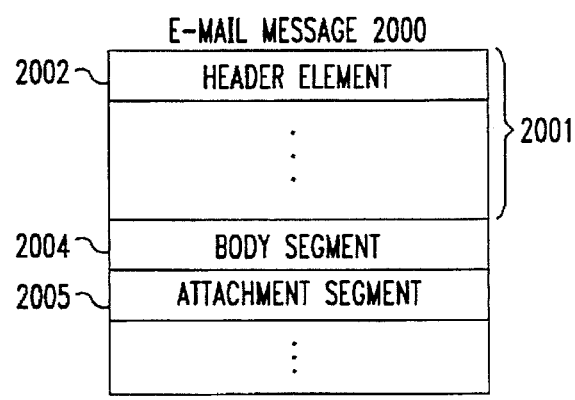
FIG. 20 is a block diagram of a second generalized e-mail system message.

The programs of FIGS. 8–18 convert e-mail messages into voice-mail messages, and vice versa. As was stated before, different e-mail systems have different message structure, objects, and/or formats. Hence, the particulars of any conversion will depend upon the particular e-mail system that serves as e-mail system 29 in the illustrative implementation. However, the various particular e-mail systems can be generalized into two types: either they represent a message as a header segment made up of one or more header elements, followed by one or more body segments, as shown in FIG. 19; or they represent a message as the header segment, followed by a single body segment, followed by zero or more attachment segments, as shown in FIG. 20. The header elements specify information about the message, such as "from", "to", "subject", "delivered" (Yes/No), "privacy" (Yes/No), "priority" (Yes/No), etc. The body segments constitute the main message itself, and the attachment segments are generally separate files that supplement the message body. The attachment segments may be either the files themselves, or descriptors that identify and point to the files. Each body segment and each attachment segment is represented in a particular medium. The following discussion assumes a generalized e-mail system that represents messages in one of these two forms.

Figure 21:
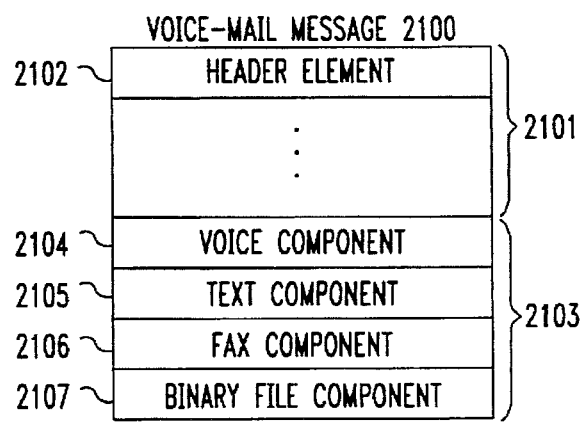
FIG. 21 is a block diagram of a generalized voice-mail system message.

Just as the particulars of e-mail systems differ from system to system, so do the particulars of voice-mail systems. The AT&T Intuity system is fairly representative of existing advanced voice-mail systems and its representation of voice-mail messages is assumed in the following discussion. It represents a message as a header component that is made up of a plurality of header elements, followed by a message body made up of one or more of the following components: a voice component, followed by a text component, followed by a fax component, followed by a binary file component. For purposes of discussion herein, it is assumed that it allows only one body component per each type of medium in a single message. This representation of a voice-mail message is shown in FIG. 21.

To properly deal with the idiosyncrasies of each e-mail system or voice-mail system, synchronizer 10 stores in memory 14 a database of information that defines the characteristics of those systems—particularly of their servers—such as what message structure, objects, media, and formats they support.

The program of FIGS. 8–13 converts voice-mail messages into e-mail messages to synchronize the contents of the e-mail mailbox of a mailbox pair with the contents of the voice-mail mailbox of the mailbox pair. When execution of the program is invoked (from step 524 of FIG. 5), at step 800, processor 12 first converts the voice-mail message's header into header elements of the corresponding e-mail message. Processor 12 creates a temporary text (temptext) file for the converted message with a text format set either to the format of the voice message's text component or to a default text type, at step 802. Processor 12 then checks information which synchronizer 10 has stored about e-mail server 20 to determine if e-mail server 20 supports a client-specified "from" field in e-mail message's header, at step 804. "Client" is used here from the viewpoint of e-mail server 20 to mean the user interface that a user would use to create an e-mail message. If so, processor 12 creates a "from" field for the converted message and populates it with the name and address (e.g., phone number) of the originator of the voice-mail message, at step 806. If e-mail server 20 does not support a "from" field, processor 12 appends a "from" paragraph to the temptext file, at step 808. The "from" paragraph specifies the name and address of the originator of the voice-mail message in textual form. Following step 806 or 808, processor 12 checks the stored information about e-mail server 20 to determine if it supports a client-specified "reply-to" field in e-mail message's header, at step 810. If so, processor 12 creates a "reply-to" field for the converted message and also populates it with the name and address of the originator of the voice-mail message, at step 812. If e-mail server 20 does not support a "reply-to" field, or following step 812, processor 12 creates a "subject" field for the converted message and populates it with the contents of the annotation field of the voice message, at step 814. Processor 12 then checks the stored information about e-mail server 20 to determine if it supports a client specified "orig-date" field in e-mail message's header, at step 816. If so, processor 12 creates an "orig-date" field for the converted message and populates it with the delivery date and time that is contained in the voice message's delivery time field, at step 818. If e-mail server 20 does not support an "orig-date" field, processor 12 appends a "from" paragraph to the temptext file and populates it with the date and time of delivery of the voice-mail message, at step 820. Following step 818 or step 820, processor 12 checks the stored information about e-mail server 20 to determine if it supports a "priority" field in e-mail message's header, at step 900 of FIG. 9. If so, processor 12 creates a "priority" field for the converted message, and either sets its contents to high priority if the voice-mail message's priority flag is set, or sets its contents to normal priority if the voice-mail message's priority flag is not set, at step 902. Following step 900 or 902, processor 12 appends to the temptext file an "orig-message-ID" paragraph containing the message identifier from the voice-message's message ID field, at step 904. Processor 12 then accesses the message's corresponding entry 222 in table 200 of FIG. 2 and checks whether it indicates that only message headers should be synchronized and propagated from mailbox 21 to mailbox 31, at step 905. If entry 222 indicates headers-only synchronization, processor 12 enters text in the temptext file to the effect that the converted message is only a partial copy of the original message that serves primarily as mere notification of the original message, at step 907, and then proceeds to step 910. If entry 222 does not indicate headers-only synchronization, processor 12 checks the privacy field of the voice-mail message to determine if the voice-mail message is marked as "private". If so, the message body cannot be converted, and hence processor 12 cannot create a full copy of the voice-mail message for the e-mail system. Processor 12 therefore enters text in the temptext file to the effect that the original message is marked as private and therefore the converted message is only a partial copy of the original message that serves primarily as mere notification of the existence of the original message, at step 908. Processor 12 also accesses the corresponding mailbox-pair state table 200 of FIG. 2 and sets the copy type field 217 of the message's corresponding entry 210 to indicate "partial copy", at step 910. Processor 12 then proceeds to step 1302 of FIG. 13.

If it is determined at step 906 that the voice-mail message is not marked private, processor 12 proceeds to convert the body of the voice-mail message into e-mail message attachments. Processor 12 determines the type of medium of the next component (here the first component—component ordering in the voice-mail message is preserved at this step) of the voice-message, at step 1000 of FIG. 10. If the medium type of the component is "voice" (i.e., audio), as determined at step 1002, processor 12 checks the stored information about e-mail server 20 to determine if it supports the audio medium, at step 1004. If e-mail server 20 supports the audio medium, processor 12 retrieves the voice medium component of the voice message and writes it into a temporary audio file (audio tempfile) in memory to create an e-mail message audio attachment, at step 1006. In the process, processor 12 also performs any trans-coding of the voice component that is needed because voice-mail system 39 and e-mail system 29 use different audio encoding formats (e.g., CELP coding versus WAV coding). Processor 12 then checks the stored information about e-mail server 20 to determine whether it requires in-line attachements, at step 1008. In-line attachments are those that are a part of the message body itself (see FIG. 19), as opposed to being separate files that are only appended to the message body (see FIG. 20) via descriptors. If in-line attachments are required, processor 12 writes an in-line audio segment into the temptext file using whatever encoding scheme is specified for e-mail server 20, at step 1010, and then proceeds to FIG. 13. If in-line attachments are not required, processor 12 creates in temptext file an attachment descriptor for the temporary audio file that was created at step 1006, that specifies the pathname, filename, and a title (e.g., "audio attachment") of the attachment, at step 1014, appends to the temptext file an "audio-xx-seconds" paragraph that specifies, in seconds, the length of the audio component of the voice-mail message, at step 1016, and then proceeds to FIG. 13.

Returning to step 1004, if it is determined there that e-mail server 20 does not support the audio medium, processor 12 appends a paragraph to the temptext file whose contents specify that this converted message is a partial copy of the original message, at step 1012, and sets the copy type field 217 of the message's corresponding entry 210 in table 200 of FIG. 2 to indicate "partial copy", at step 1013. Processor 12 then appends the "audio-xx-seconds" paragraph to the temptext file, at step 1016, and finally proceeds to FIG. 13.

Figure 11:
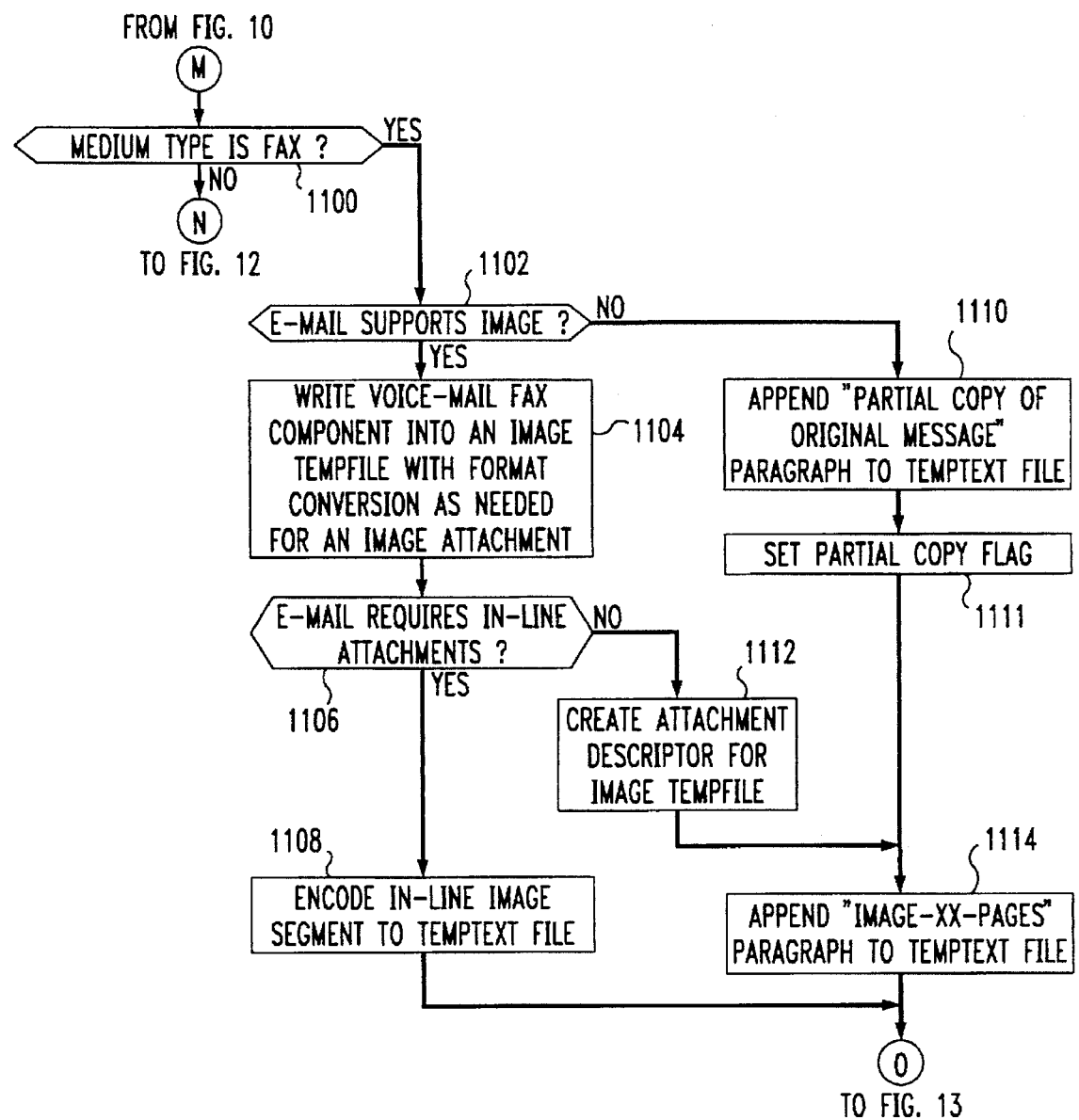

Returning to step 1002, if it is determined there that the subject voice-message component's medium type is not "voice", processor 12 checks whether the medium type is "fax", at step 1100 of FIG. 11. If the medium type is "fax", processor 12 checks the stored information about e-mail server 20 to determine if it supports the fax medium, at step 1104. If e-mail server 20 supports the fax medium, processor 12 retrieves the fax medium component of the voice message and writes it into a temporary image file (image tempfile) in memory to create an e-mail message image attachment, at step 1106. In the process, processor 12 also performs any format conversion of the fax component that is needed because voice-mail system 39 and e-mail system 29 use different image encoding formats (e.g., G3 TIFF format versus PCX, GIF, BMP, etc.). Processor 12 then checks the stored information about e-mail server 20 to determine whether it requires in-line attachments, at step 1106. If in-line attachments are required, processor 12 encodes an in-line image segment into the temptext file, at step 1108, and then proceeds to FIG. 13. If in-line attachments are not required, processor 12 creates in temptext file an attachment descriptor for the temporary image file that was created at step 1104, that specifies a pathname, a filename, and a title of the image file, at step 1112, appends to the temptext file an "image-xx-pages" paragraph that specifies, in number of pages, the length of the fax content of the fax component of the voice-mail message, at step 114, and then proceeds to FIG. 13.

Returning to step 1102, if it is determined there that e-mail server 20 does not support the image medium, processor 12 appends a paragraph to the temptext file whose contents specify that this converted message is a partial copy of the original message, at step 1110, and sets the copy type field 217 of the message's corresponding entry 210 in table 200 of FIG. 2 to indicate "partial copy", at step 1111. Processor 12 then appends the "image-xx-pages" paragraph to the temptext file, at step 1114, and finally proceeds to FIG. 13.

Figure 12:
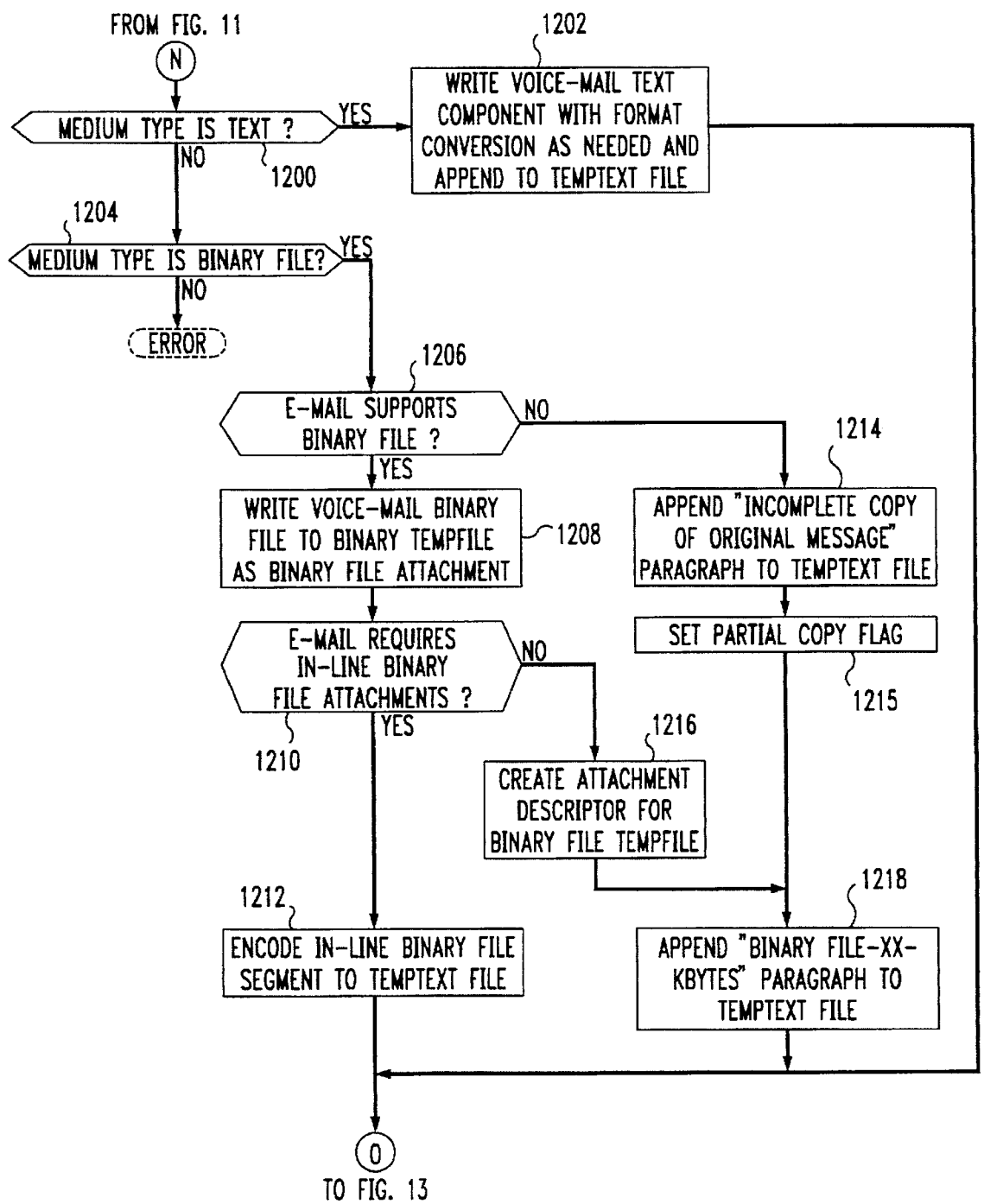

Returning to step 1100, if it is determined there that the subject voice-message component's medium type is not "fax", processor 12 checks whether the medium type is "text", at step 1200 of FIG. 12. If the medium type is "text", processor 12 retrieves the text file component of the voice message and appends it to the temptext file, at step 1202. Processor 12 then proceeds to FIG. 13.

Returning to step 1200, if it is determined there that the subject voice-message component's medium type is not "text", processor 12 checks whether the medium type is "binary file", at step 1204. (It will not be determined here that the subject voice-message component's medium type is not "binary file", since no other media are presently supported. However, the decision box provides for future capability expansion to handle other media.) If the medium type is "binary file", processor 12 checks the stored information about e-mail server 20 to determine if it supports the binary file medium, at step 1206. If e-mail server 20 supports the binary file medium, processor 12 retrieves the binary-file medium component of the voice message and writes it into a temporary binary file (binary tempfile) to create an e-mail message binary file attachment, at step 1208. Processor 12 then checks the stored information about e-mail server 20 to determine whether it requires in-line attachments, at step 1210. If in-line attachments are required, processor 12 encodes an in-line binary-file segment into the temptext file, at step 1212, and then proceeds to FIG. 13. If in-line attachments are not required, processor 12 creates in temptext file an attachment descriptor for the temporary binary file that was created at step 1208, at step 1216, appends to the temptext file a "binary file-xx-kbytes" paragraph that specifies, in number of kilobytes, the size of the content of the binary file component of the voice-mail message, at step 1218, and then proceeds to FIG. 13.

Returning to step 1206, if it is determined there that e-mail server 20 does not support the binary file medium, processor 12 appends a paragraph to the temptext file whose contents specify that this converted message is a partial copy of the original message, at step 1214, and sets the copy type field 217 of the message's corresponding entry 210 in table 200 of FIG. 2 to indicate "partial copy", at step 1215. Processor 12 then appends the "binary file-xx-kbytes" paragraph to the temptext file, at step 1218, and finally proceeds to FIG. 13.

Figure 13:
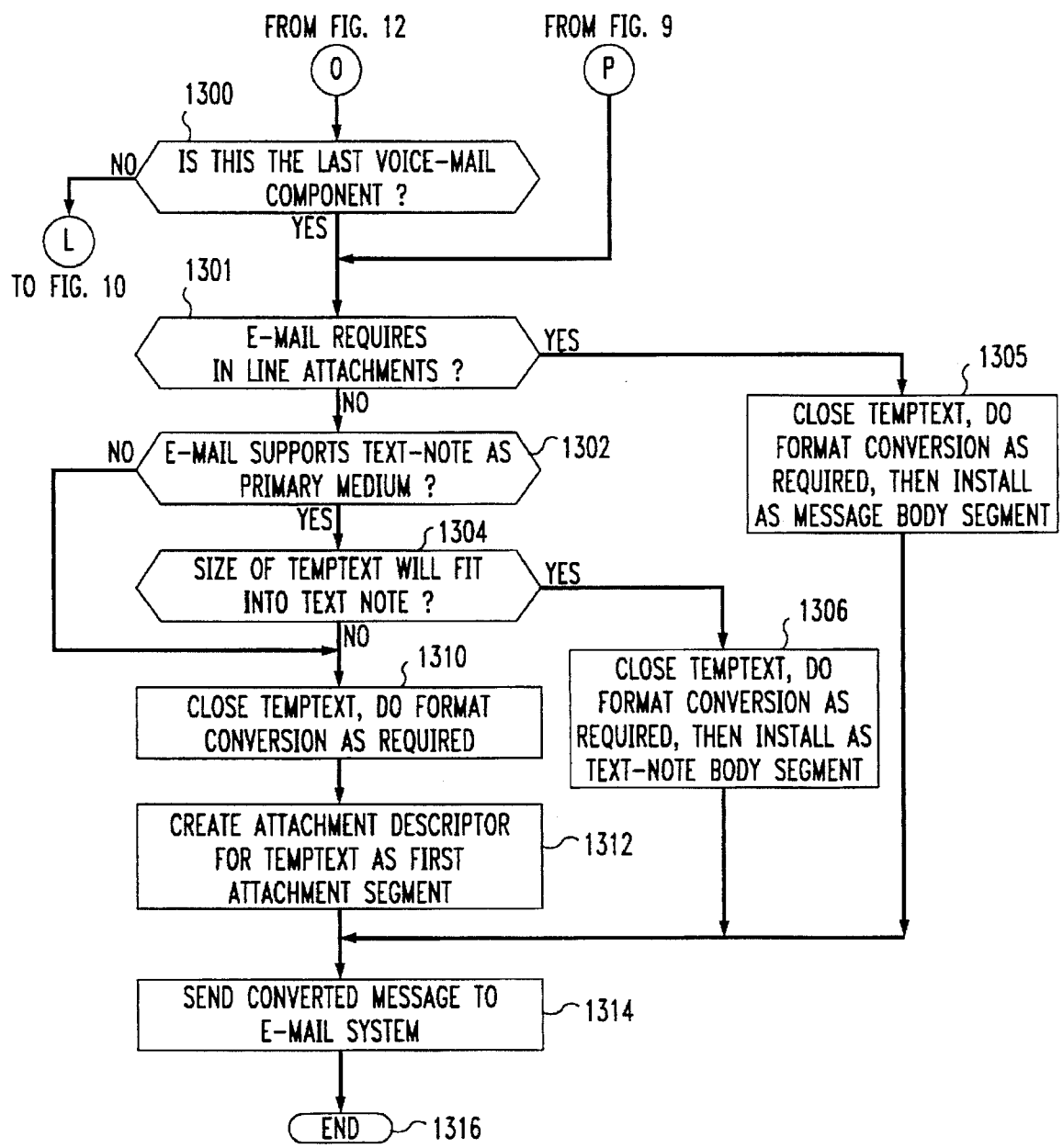
Figure 14:
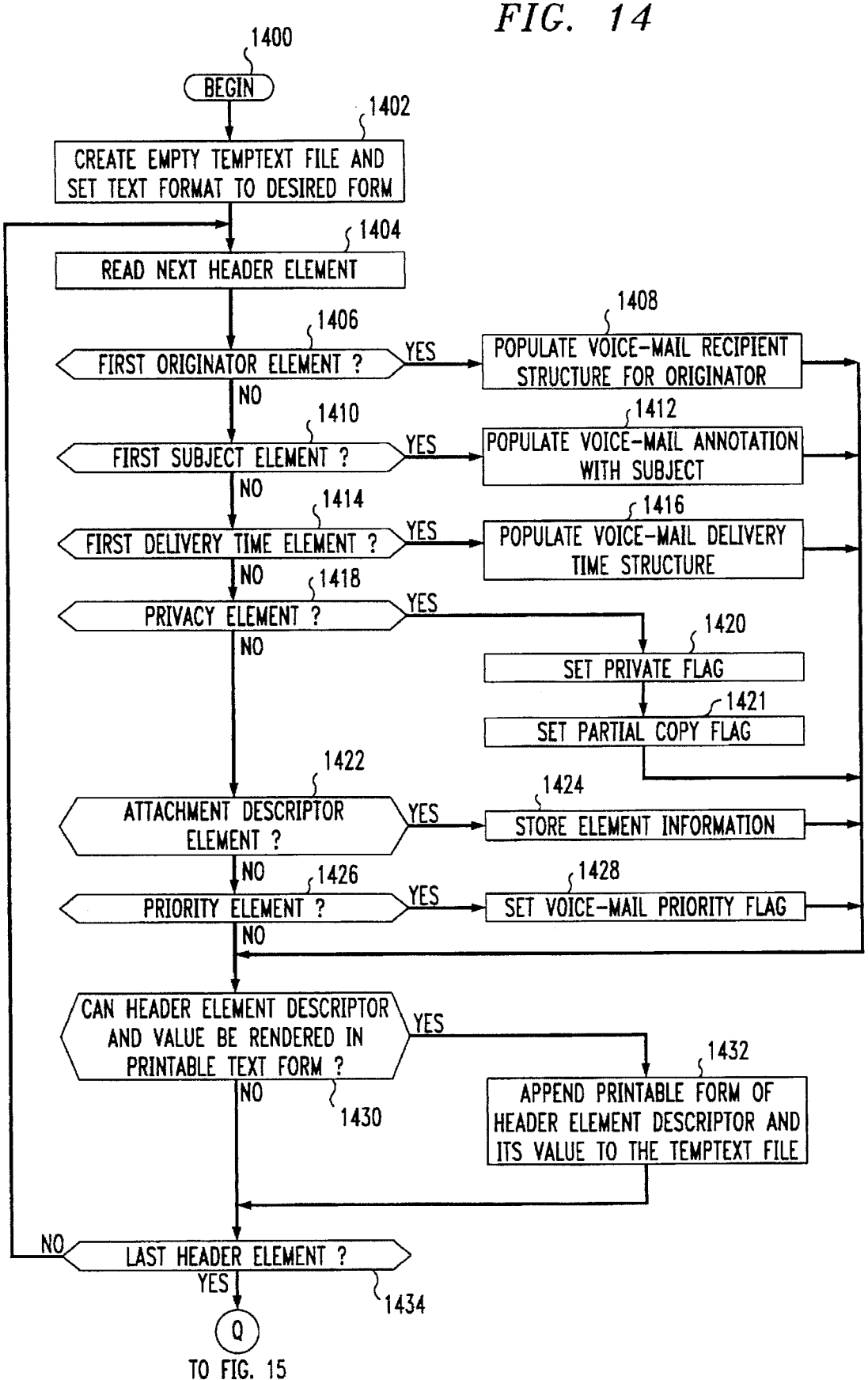
FIGS. 14–18 are a flow diagram of a message-creation function of the synchronizer of the system of FIG. 1 for creating a voice-mail system message from an e-mail system message.

At step 1300 of FIG. 13, processor 12 checks the voice message to determine if the just-processed message component was the last message component of the voice message. If not, processor 12 returns to step 1000 of FIG. 10 to process the next component of the voice message. If the just processed component was the last component, processor 12 checks the stored information about e-mail server 20 to again determine if it requires in-line attachments, at step 1301. If so, processor 12 closes the temptext file, converts it into the format required by e-mail server 20, and then installs (i.e., appends) the temptext file as the message body segment of the e-mail message that it is creating, at step 1305. If e-mail server 20 does not require in-line attachments, processor 12 checks the stored information about e-mail server 20 to determine if it supports "text-note" as the primary medium, at step 1302, and if so, what is the maximum supported text-note size. If e-mail server 20 supports "text-note" as the primary medium, processor 12 checks whether the maximum supported text-note size is sufficient to accommodate the temptext file, at step 1304. If the temptext file will be accommodated, processor 12 closes the temptext file, converts it into the format required by e-mail server 20, and then installs it as a text-note body segment of the e-mail message that it is creating, at step 1306. If e-mail server 20 does not support "text note" as the primary medium, or if the maximum supported text-note size is insufficient to accommodate the temptext file, as determined at steps 1302 and 1304, respectively, processor 12 closes the temptext file, and converts it into the format required for a text attachment in e-mail server 20, at step 1310. Processor 12 then creates an attachment descriptor for the temptext file and installs the descriptor as the first attachment segment of the message that it is creating, at step 1312. Following step 1306 or 1312, message conversion is completed, and processor 12 sends the converted message to e-mail server 20, at step 1314, illustratively by calling a "send" function of e-mail server 20. Execution of the program then ends, at step 1316.

The program of FIGS. 14–18 converts e-mail messages into voice-mail messages to synchronize the contents of the e-mail mailbox of a mailbox pair with the contents of the voice mailbox of the mailbox pair. When execution of the program is invoked (from step 424 of FIG. 4), at step 1400, processor 12 first converts the e-mail message's header segment into a message header component of the corresponding voice-mail message. Processor 12 creates a temporary text (temptext) file for the converted message with a text format set to the text format supported by the e-mail system, at step 1402. If the e-mail system supports rich text, processor 12 sets the format to the rich text format; else it sets the format to plain text (i.e., ASCII). The text format is determined by processor 12 from the information which synchronizer 10 has stored about e-mail server 20. Processor 12 then reads the next (here the first) header element of the e-mail message, at step 1404, and checks whether this is the first "originator" element, at step 1406. If so, processor 12 populates a recipient data structure of the voice mail message with the originator information, at step 1408, and then proceeds to step 1430. (Subsequent originator elements are ignored). If this is not the first "originator" element, processor 12 checks whether this is the first "subject" element, at step 1410. (Subsequent subject elements are ignored). If so, processor 12 populates an annotation of the voice mail message with the subject information, at step 1412, and then proceeds to step 1430. If this is not the first "subject" element, processor 12 checks whether this is the first "delivery time" element, at step 1414. (Subsequent delivery-time elements are ignored). If so, processor 12 populates a delivery time data structure of the voice mail message with the delivery information, at step 1416, and then proceeds to step 1430. If this is not the first "delivery time" element, processor 12 checks whether this is a "privacy" element, at step 1418. If so, processor 12 sets a "private" flag of the voice mail message, at step 1420, sets the copy type field 217 of the message's entry 210 in table 200 of FIG. 2 to "partial copy", at step 1421, and then proceeds to step 1430. If this is not a "privacy" element, processor 12 checks whether this is an attachment descriptor element, at step 1422. While this step is not needed for most e-mail systems because they do not contain attachment descriptors among header elements, a few (such as Novell's MHS, for example) do. For these systems, processor 12 merely stores the descriptor element information in memory 14, at step 1424, to be acted upon after the body of the e-mail message has been processed. Processor 12 then proceeds to step 1430. If the element is found to not be an attachment descriptor element at step 1422, processor 12 checks whether it is a "priority" element, at step 1426. If so, processor 12 sets the "priority" flag of the voice-mail message, at step 1428, and then proceeds to step 1430. If the element is not a "priority" element, processor 12 proceeds to step 1430.

At step 1430, processor 12 determines whether the header element's descriptor and the descriptor's value (i.e., data contents) can be represented in printable text form. If so, processor 12 appends a printable text form of the header element descriptor and the descriptor's value to the temptext file, at step 1432. Following step 1432, or if the header element's descriptor and value are determined at step 1430 to not be representable in printable text form, processing of the header element ends, and processor 12 checks whether this header element was the last header element of the e-mail message, at step 1434. If not, processor 12 returns to step 1404 to process the next header element. If this is the last header element, processor 12 proceeds to process the body segments of the e-mail message, in FIG. 15.

Figure 15:
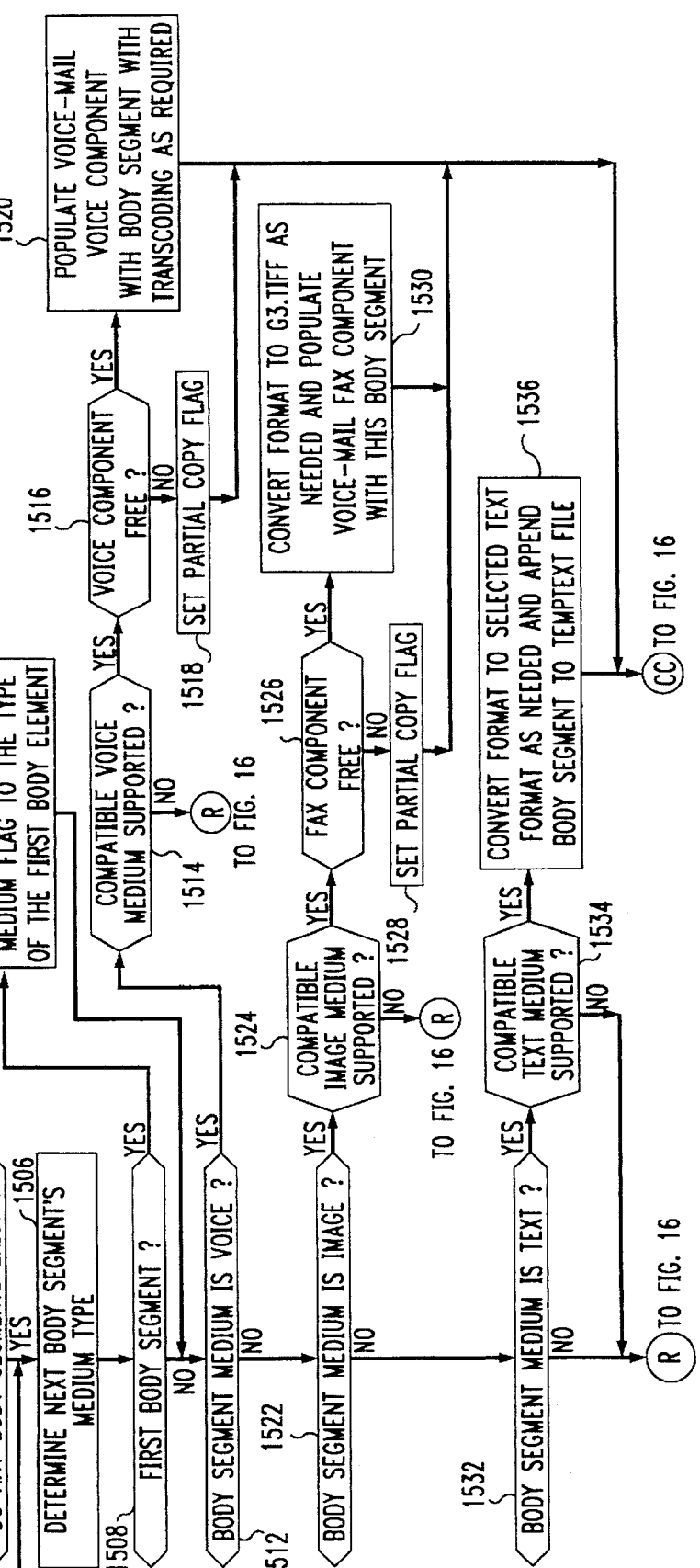

At step 1500 of FIG. 15, processor 12 appends a"-----" TTS begin marker to the temptext file. This marker indicates to voice-mail server 30 the point in the voice-mail message at which voice playback of the messages is to begin. Placing the marker after the header allows the recipient to hear the message body immediately without having to listen to the header first. Processor 12 then accesses the message's corresponding entry 223 in table 200 of FIG. 2 and checks whether it indicates that only message headers should be synchronized and propagated from mailbox 31 to mailbox 21, at step 1501. If entry 223 indicates headers-only synchronization, processor 12 enters text in the temptext file to the effect that the converted message is only a partial copy of the original message that serves primarily as a mere notification of the original message, at step 1503, and then proceeds to step 1505. If entry 223 does not indicate headers-only synchronization, processor 12 checks whether the e-mail message has a "privacy", "security", or "sensitivity" element, at step 1502. Values for these elements may indicate that the message content is private or that the message content is encrypted. In any case, if privacy or encryption is indicated by these elements, the message body cannot or should not be convened. Processor 12 therefore sets the copy type field 217 of the message's corresponding entry 210 in table 200 of FIG. 2 to indicate "partial copy", at step 1505, and then proceeds to FIG. 18. If the e-mail message does not have a "privacy", "security", or "sensitivity" element, processor 12 checks whether the message has any body segments, at step 1504. If not, there are no body segments to process, and so processor 12 proceeds to step 1800 of FIG. 18. If the message does have at least one body segment, processor 12 accesses the next (here the first) body segment and determines its medium type, at step 1506. If this is the first body segment, as indicated at step 1508, processor 12 sets the primary medium flag of the voice mail message to the medium type determined at step 1506, at step 1510, and then proceeds to step 1512. If this is not the first body segment, processor 12 checks, at step 1512, whether the segment's medium is voice. If it is voice, processor 12 checks its stored information about voice-mail server 30 to determine if voice-mail server 30 supports a compatible voice medium, at step 1514. "Compatible" is used herein to mean that the segment's format and coding scheme are understood and can be converted into the voice-mail's required format and coding scheme. If not, processor 12 proceeds to step 1600 of FIG. 16, where the segment will be treated as a binary file component. If voice-mail server 30 supports the voice medium, processor 12 checks the voice-mail message that it is creating to determine if its voice component is still free (empty), at step 1516. If not, processor 12 sets the copy type field 217 of the message's corresponding entry 210 in table 200 of FIG. 2 to "partial copy", at step 1518, and then proceeds to step 1610 of FIG. 16. If the voice component of the voice-mail message is free, processor 12 populates it with the contents of the subject body segment of the e-mail message, at step 1520. In the process, processor 12 performs any format conversion that is necessary because the voice-mail system and the e-mail system use different voice coding formats. Processor 12 then proceeds to step 1610 of FIG. 16.

Returning to step 1512, if it is determined there that the subject body segment's medium is not voice, processor 12 checks whether the body segment's medium is image, at step 1522. If it is image, processor 12 checks stored information about voice-mail server 30 to determine if it supports a compatible image medium, at step 1524. If not, processor 12 proceeds to step 1600 of FIG. 16, where the segment will be treated as a binary file component. If voice-mail server 30 supports the image medium, processor 12 checks the voice-mail message that it is creating to determine if its fax component is still free, at step 1526. If not, processor 12 sets the copy type field 217 of the message's corresponding entry 210 in table 200 of FIG. 2 to "partial copy", at step 1528, and then proceeds to step 1610 of FIG. 16. If the fax component of the voice-mail message is free, processor 12 populates it with the contents of the subject body segment of the e-mail message, at step 1530. In the process, processor 12 performs any format conversion that is necessary because the e-mail system encoded the image in a format that is different from the fax coding format (e.g., G3 TIFF) used by the voice-mail system. Processor 12 then proceeds to step 1610 of FIG. 16.

Returning to step 1522, if it is determined them that the subject body segment's medium is not image, processor 12 checks whether the body segment's medium is text, at step 1532. If it is text, processor 12 checks stored information about voice-mail server 30 to determine if it supports a compatible text medium, at step 1534. If not, processor 12 proceeds to step 1600 of FIG. 16, where the segment will be treated as a binary file component. If voice-mail server 30 supports the text medium, processor 12 retrieves the contents of the body segment and appends them to the temptext file, at step 1536. In the process, processor 12 performs any format conversion that is necessary because the voice-mail system and the e-mail system use different text formats. Processor 16 then proceeds to step 1610 of FIG. 16.

Figure 16:
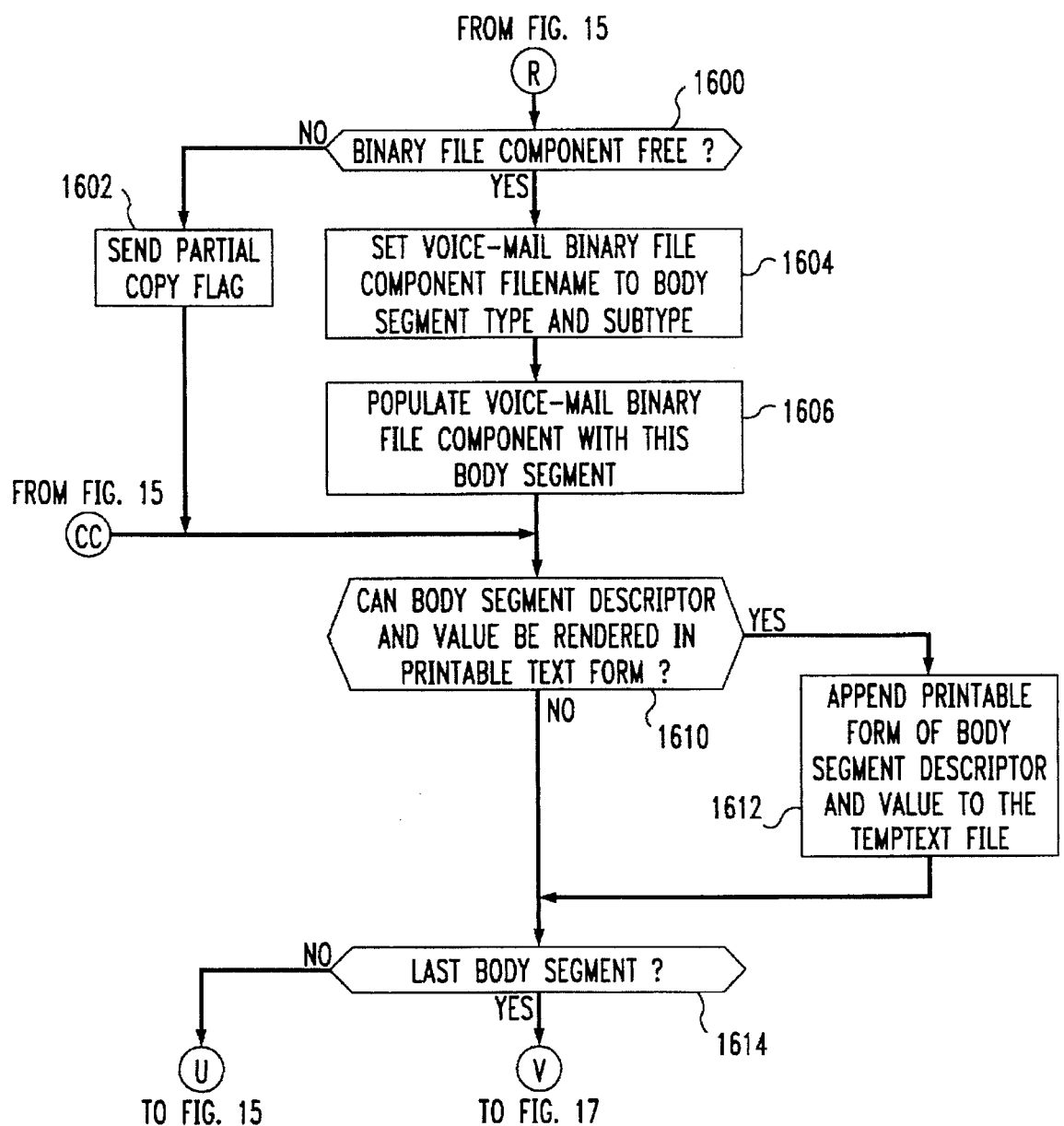
Figure 17:
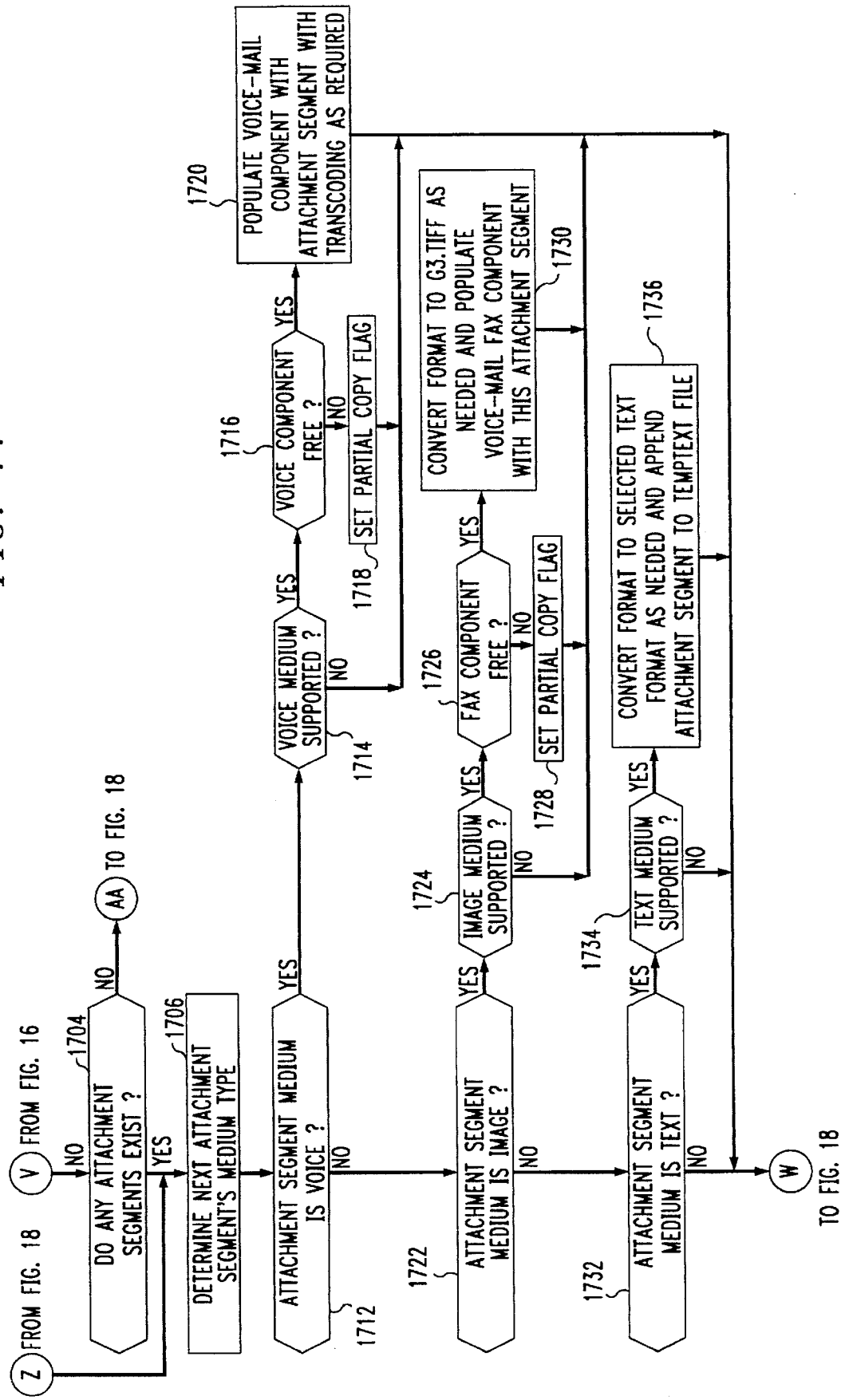
Figure 18:
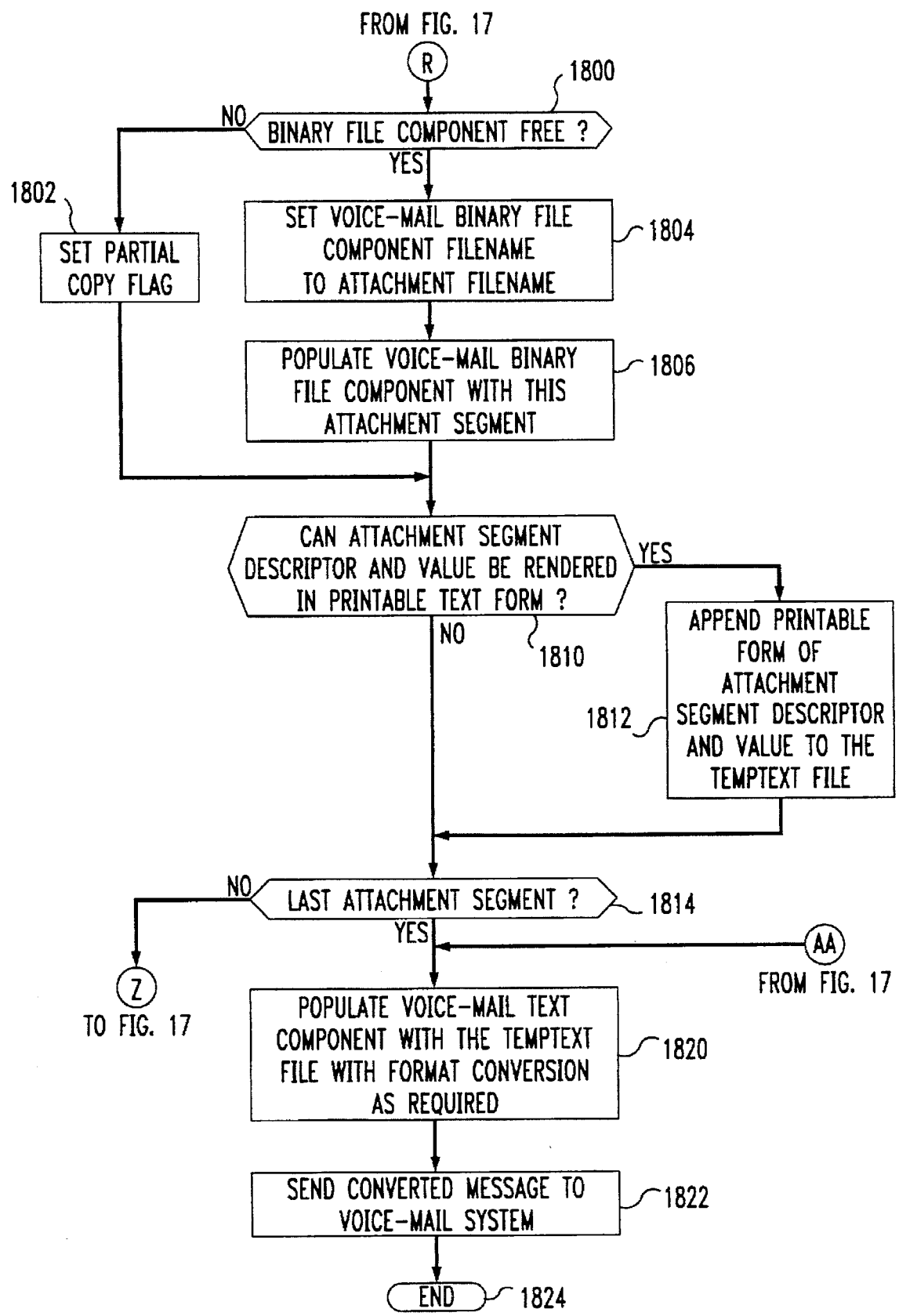

At step 1600 of FIG. 16, processor 12 checks whether the binary file component of the voice-message that it is creating is still free. If not, processor 12 sets the copy field 217 of the message's corresponding entry 210 in table 200 of FIG. 2 to "partial copy", at step 1602, and then proceeds to step 1610. If the binary component is free, processor 12 sets its component filename to the body segment type and subtype of the subject e-mail body segment, at step 1604. Processor 12 then populates the binary file component of the voice-mail message with the contents of the subject body segment, at step 1606, and proceeds to step 1610.

At step 1610, processor 12 checks whether the body segment's descriptor and the descriptor's value can be represented in printable text form. If so, processor 12 appends a printable text version of the body segment descriptor and the descriptor's value to the temptext file, at step 1612. Following step 1612, or if it is determined at step 1610 that the descriptor and its value cannot be represented in printable text form, processor 12 determines whether the subject body segment is the last body segment of the e-mail message, at step 1614. If it is not the last body segment, processor 12 returns to step 1506 of FIG. 15 to process the next body segment. If it is the last body segment, processor 12 proceeds to FIGS. 17–18 to process any attachment segments of the e-mail message, in the identical manner as it had processed the body segments at steps 1504–1506 and 1512–1536 of FIG. 15 and in FIG. 16. The only difference is that, at step 1804, processor 12 sets the voice-mail message's binary file component's filename to the filename of the subject attachment segment. With respect to e-mail systems that store attachment descriptors as a part of the message header, the processing in FIGS. 17 and 18 involves processing of the files that are identified by the descriptor elements analogous to those that were stored at step 1424 of FIG. 14.

After it has finished processing the last attachment segment at step 1814, processor 12 populates the voice-mail message's text component with the contents of the temptext file, at step 1820. In the process, processor 12 performs any format conversion necessary to put the temptext file contents into the text format that is used by voice mail server 30. The conversion of the e-mail message into a corresponding voice-mail message is completed, and processor 12 sends the converted e-mail message to voice-mail server 30, at step 1822. Execution of the program then ends, at step 1824.

Of course, various changes and modifications to the illustrative embodiment described above will be apparent to those skilled in the art. For example, the interfaces between the synchronizer and the plurality of messaging systems being synchronized may be identical. Furthermore, the voice-mail system may allow more than one component per each type of medium. Also, support of additional media types and formats (e.g., video medium, text-processing format for text, etc.) may be provided by either or both the e-mail system and the voice-mail system. Furthermore, support for arbitrary message header properties and arbitrary quantities thereof may likewise be provided. Or, support may be provided for decrypting private encrypted messages. Conversely, entry of summaries about attachments, or notifications of partial copies during header-only synchronization, into the message body may be eliminated. Furthermore, synchronizing of outgoing-message mailboxes and outgoing message status indications may also be performed, in a manner analogous to that described above for incoming-message mailboxes and incoming message status indications. Such changes and modifications can be made without departing from the spirit and the scope of the invention and without diminishing its attendant advantages. It is therefore intended that such changes and modifications be covered by the following claims.

The invention claimed is:

1. An apparatus for indicating in one of a first mailbox of a first electronic messaging system and a second mailbox of a second electronic messaging system a content and a state of a message stored in another of the first mailbox and the second mailbox, the first electronic messaging system for handling first messages and defining at least one first mailbox for storing the first messages, each first message having a first data structure containing information expressed in a first medium and having a first format, and each stored first message having one of a plurality of states, and the second electronic messaging system for handling second messages and defining at least one second mailbox for storing the second messages, each second message having a second data structure containing information expressed in a second medium and having a second format, at least one of the second data structure, the second medium, and the second format being different respectively from the first data structure, the first medium, and the first format, and each stored second message having one of the plurality of states, the apparatus comprising:

first means, cooperative with the first mailbox and the second mailbox and responsive to storing of a second message in the second mailbox, for retrieving at least some of the information from the second message, generating a corresponding first message forming a message pair with the second message and containing at least some of the information retrieved from the second message, storing the first message in the first mailbox, and also raising a partial-copy indication for the first message if the first message does not contain all of the information contained in the second message of the message pair;

second means, cooperative with the first mailbox and the second mailbox and responsive to a change in state of one of the stored messages of the message pair, for effecting a same said change in state of other of the stored messages of the message pair; and third means, cooperative with the first mailbox and the second mailbox and responsive to deletion of one of the stored messages of the message pair from one of the mailboxes, for deleting other of the stored messages of the message pair from other of the mailboxes.

2. The apparatus of claim 1 further comprising:

fourth means, cooperative with the first mailbox and the second mailbox and responsive to storing of a first message in the first mailbox, for retrieving at least some of the information from the first message, generating a corresponding second message forming a message pair with the first message and containing at least some of the information retrieved from the first message, storing the second message in the second mailbox, and also raising a partial-copy indication for the second message if the second message does not contain all of the information contained in the first message of the message pair; wherein the second means comprise fifth means, cooperative with the first mailbox and the second mailbox and responsive to a change in state of the stored second message of the message pair, for effecting a same said change in state of the stored first message of the message pair, and sixth means, cooperative with the first mailbox and the second mailbox and responsive to a change in state of the stored second message of a message pair, for effecting a same said change in state of the stored first message of the message pair; and wherein the third means comprise seventh means, cooperative with the first mailbox and the second mailbox and responsive to deletion of the stored second message of the message pair from the second mailbox, for deleting the stored first message of the message pair from the first mailbox, and eighth means, cooperative with the first mailbox and the second mailbox and responsive to deletion of the stored first message of the message pair from the first mailbox, for deleting the stored second message of the message pair from the second mailbox.

3. The apparatus of claim 2 wherein:

the apparatus includes a data record for each message pair, the data record holding data that indicate an identifier of the first message of the message pair, an identifier of the second message of the message pair, the state of the first message of the message pair, the state of the second message of the message pair, which one of the first and the second electronic messaging systems is a native system of the message pair, and whether the corresponding one of the messages of the message pair is a full copy or a partial copy of the other of the messages of the message pair.

4. The apparatus of claim 2 wherein:

the plurality of states are a sequence of the plurality of states; and the fifth means comprise ninth means, cooperative with the first mailbox and the second mailbox and responsive to a sequential change in state of the stored second message of any message pair, for effecting same said change in state of the stored first message of said any message pair, and tenth means, cooperative with the seventh means and the ninth means and responsive to a non-sequential change in the state of the stored second message of an individual message pair, for causing the ninth means to cease being responsive to changes in the state of the stored second message of the individual message pair and for causing the seventh means to cease being responsive to the deletion of the stored second message of the individual message pair from the second mailbox, whereby the apparatus ceases to perform said indicating for the individual message pair.

5. The apparatus of claim 4 wherein:

the sixth means comprise eleventh means, cooperative with the first mailbox and the second mailbox and responsive to a sequential change in state of the stored first message of any message pair, for effecting same said change in state of the stored second message of said any message pair, and twelfth means, cooperative with the eighth means and the eleventh means and responsive to a non-sequential change in the state of the stored first message of an individual message pair, for causing the eleventh means to cease being responsive to changes in the state of the stored first message of the individual message pair and for causing the eighth means to cease being responsive to the deletion of the stored first message of the individual message pair from the first mailbox, whereby the apparatus ceases to perform said indicating for the individual message pair.

6. The apparatus of claim 5 wherein:

the apparatus includes a data record for each message pair, the data record holding data that indicate an identifier of the first message of the message pair, an identifier of the second message of the message pair, the state of the first message of the message pair, the state of the second message of the message pair, which one of the first and the second electronic messaging systems is a native system of the message pair, whether the corresponding one of the messages of the message pair is a full copy or a partial copy of the other of the messages of the message pair, and whether said indicating is being performed for the message pair.

7. The apparatus of claim 6 wherein:

the ninth means include thirteenth means, cooperative with the first mailbox and the second mailbox and responsive to a change in state of the stored second message of an individual message pair to a state other than an expired state, for effecting a same said change in the state of the stored first message of the message pair, and fourteenth means, cooperative with the seventh means and the ninth means and responsive to a change in state of the stored second message of the individual message pair to the expired state, for causing the ninth means to cease being responsive to changes in the state of the stored second message of the individual message pair and for causing the seventh means to cease being responsive to the deletion of the stored second message of the individual message pair from the second mailbox, whereby the apparatus ceases to perform said indicating for the individual message pair.

8. The apparatus of claim 7 wherein:

the first messaging system is an e-mail system and the second messaging system is a voice-mail system.

9. The apparatus of claim 6 wherein:

the ninth means include thirteenth means, cooperative with the first mailbox and the second mailbox and responsive to a change in state of the stored second message, of an individual message pair whose data record indicates that the second messaging system is the native system, to a state other than an expired state, for effecting a same said change in the state of the first message of the message pair, and fourteenth means, cooperative with the seventh means and the ninth means and responsive to a change in state of the stored second message of the individual message pair to the expired state, for causing the ninth means to cease being responsive to changes in the state of the stored second message of the individual message pair and for causing the seventh means to cease being responsive to the deletion of the stored second message of the individual message pair from the second mailbox, whereby the apparatus ceases to perform said indicating for the individual message pair.

10. The apparatus of claim 1 wherein:

the second means include fourth means, cooperative with the first mailbox and the second mailbox and responsive to a change in state of the stored second message of an individual message pair to a state other than an expired state, for effecting a same said change in the state of the stored first message of the message pair, and fifth means, cooperative with the third means and the fourth means and responsive to a change in state of the stored second message of the individual message pair to the expired state, for causing the fourth means to cease being responsive to changes in the state of the stored second message of the individual message pair and for causing the third means to cease being responsive to deletion of the stored second message of the individual message pair from the second mailbox, whereby the apparatus ceases to perform said indicating for the individual message pair.

11. The apparatus of claim 1 wherein:

one of the first and the second messaging systems is an e-mail system and another of the first and the second messaging systems is a voice-mail system.

12. The apparatus of claim 1 wherein:

the first means include means, cooperative with the first mailbox and the second mailbox and responsive to storing of a second message that is marked as private in the second mailbox, for retrieving only header information from the second message, generating a corresponding first message forming a message pair with the second message and containing only the header information from the second message, storing the first message in the first mailbox, and raising the partial-copy indication for the first message.

13. The apparatus of claim 1 wherein:

the first means include means, cooperative with the first mailbox and the second mailbox and responsive to storing of a second message containing information that is encrypted in the second mailbox, for retrieving at least any non-encrypted information from the second message, generating a corresponding first message forming a message pair with the second message and containing only said any non-encrypted information retrieved from the second message, storing the first message in the first mailbox, and raising the partial-copy indication for the first message.

14. The apparatus of claim 1 wherein:

the second message comprises a message header and a message body; and the first means include fourth means, cooperative with the first mailbox and the second mailbox and responsive to storing of the second message in the second mailbox, for determining whether the first mailbox is to be synchronized partially or fully with the second mailbox, and fifth means, cooperative with the first mailbox and the second mailbox and the fourth means and, responsive to a determination by the fourth means that the first mailbox is to be synchronized partially with the second mailbox, for retrieving the message header and not retrieving the message body of the second message, generating from the retrieved message header the corresponding first message comprising a message header and not comprising a message body, storing generated corresponding first message in the first mailbox, and also raising the partial-copy indication for the first message, and further responsive to a determination by the fourth means that the first mailbox is to be synchronized fully with the second mailbox, for retrieving the message header and at least some of the message body of the second message generating from the retrieved message header and the at least some of the message body of the second message the corresponding first message comprising a message header and a message body, storing the generated corresponding first message in the first mailbox, and also raising the partial-copy indication for the first message if the first message does not contain all of the message body of the second message.

15. The apparatus of claim 1 wherein:

each first message has a first data structure containing at least one first data object of information, each first data object being expressed in one of a plurality of first media and having one of a plurality of first formats, each second message has a second data structure containing at least one second data object of information, each second data object being expressed in one of a plurality of second media and having one of a plurality of second formats, at least one of the plurality of second media and the plurality of second formats being different respectively from the plurality of first media and the first formats, and the first means include means, cooperative with the first mailbox and the second mailbox and responsive to storing of a second message in the second mailbox that contains an individual first data object expressed in an individual second medium and having an individual second format which cannot be converted by the synchronizer into a first data object expressed in a first medium and having a first format, for retrieving from the second message at least second data objects other than the individual data object, generating a corresponding first message forming a message pair with the second message and containing first data objects by converting the second medium and the second format of each retrieved second data object other than the individual second data object into a first medium and a first format of a first data object, storing the first message in the first mailbox, and raising the partial-copy indication for the first message.

16. An apparatus comprising:

a first electronic messaging system for handling first messages and defining at least one first mailbox for storing the first messages, each first message having a first data structure containing information expressed in a first medium and having a first format, and each stored first message having one of a plurality of states;

a second electronic messaging system for handling second messages and defining at least one second mailbox for storing the second messages, each second message having a second data structure containing information expressed in a second medium and having a second format, at least one of the second data structure, the second medium, and the second format being different respectively from the first data structure, the first medium, and the first format, and each stored second message having one of the plurality of states; and means for indicating in one of a first mailbox of the first messaging system and a second mailbox of the second messaging system a content and a state of a message stored in another of the first mailbox and the second mailbox, including first means, cooperative with the first mailbox and the second mailbox and responsive to storing of a second message in the second mailbox, for retrieving at least some of the information from the second message, generating a corresponding first message forming a message pair with the second message and containing at least some of the information retrieved from the second message, storing the first message in the first mailbox, and also raising a partial-copy indication for the first message if the first message does not contain all of the information contained in the second message of the message pair, second means, cooperative with the first mailbox and the second mailbox and responsive to a change in state of one of the stored messages of the message pair, for effecting a same said change in state of other of the stored messages of the message pair, and third means, cooperative with the first mailbox and the second mailbox and responsive to deletion of one of the stored messages of the message pair from one of the mailboxes, for deleting other of the stored messages of the message pair from other of the mailboxes.

17. The apparatus of claim 16 wherein:

the means for indicating further comprise fourth means, cooperative with the first mailbox and the second mailbox and responsive to storing of a first message in the first mailbox, for retrieving at least some of the information from the first message, generating a corresponding second message forming a message pair with the first message and containing at least some of the information retrieved from the first message, storing the second message in the second mailbox, and also raising a partial-copy indication for the second message if the second message does not contain all of the information contained in the first message of the message pair; wherein the second means comprise fifth means, cooperative with the first mailbox and the second mailbox and responsive to a change in state of the stored second message of the message pair, for effecting a same said change in state of the stored first message of the message pair, and sixth means, cooperative with the first mailbox and the second mailbox and responsive to a change in state of the stored second message of a message pair, for effecting a same said change in state of the stored first message of the message pair; and wherein the third means comprise seventh means, cooperative with the first mailbox and the second mailbox and responsive to deletion of the stored second message of the message pair from the second mailbox, for deleting the stored first message of the message pair from the first mailbox, and eighth means, cooperative with the first mailbox and the second mailbox and responsive to deletion of the stored first message of the message pair from the first mailbox, for deleting the stored second message of the message pair from the second mailbox.

18. A method of indicating in one of a first mailbox of a first electronic messaging system and a second mailbox of a second electronic messaging system a content and a state of a message stored in another of the first mailbox and the second mailbox, the first electronic messaging system for handling first messages and defining at least one first mailbox for storing the first messages, each first message having a first data structure containing information expressed in a first medium and having a first format, and each stored first message having one of a plurality of states, and the second electronic messaging system for handling second messages and defining at least one second mailbox for storing the second messages, each second message having a second data structure containing information expressed in a second medium and having a second format, at least one of the second data structure, the second medium, and the second format being different respectively from the first data structure, the first medium, and the first format, and each stored second message having one of the plurality of states, the method comprising the steps of:

in response to storing of a second message in the second mailbox, retrieving at least some of the information from the second message;

generating a corresponding first message forming a message pair with the second message and containing at least some of the information retrieved from the second message;

storing the first message in the first mailbox;

raising a partial-copy indication for the first message, if the first message does not contain all of the information contained in the second message of the message pair;

in response to a change in state of one of the stored messages of the message pair, effecting a same said change in state of other of the stored messages of the message pair; and in response to deletion of one of the stored messages of the message pair from one of the mailboxes, deleting other of the stored messages of the message pair from other of the mailboxes.

19. The method of claim 18 further comprising the steps of in response to storing of a first message in the first mailbox, retrieving at least some of the information from the first message, generating a corresponding second message forming a message pair with the first message and containing at least some of the information retrieved from the first message, storing the second message in the second mailbox, and raising a partial-copy indication for the second message, if the second message does not contain all of the information contained in the first message of the message pair; wherein the step of effecting comprises the steps of in response to a change in state of the stored second message of the message pair, effecting a same said change in state of a stored said first message of the message pair, and in response to a change in state of the stored first message of a message pair, effecting a same said change in state of a stored said second message of the message pair; and wherein the step of deleting comprises the steps of in response to deletion of the stored second message of the message pair from the second mailbox, deleting a stored said first message of the message pair from the first mailbox, and in response to deletion of the stored first message of a message pair from the first mailbox, deleting a stored said second message of the message pair from the second mailbox.

* * * * *